United States Patent
Shigeta

(10) Patent No.: US 9,594,586 B2
(45) Date of Patent: Mar. 14, 2017

(54) SCALE-OUT METHOD AND SYSTEM

(71) Applicant: FUJITSU LIMITED, Kawasaki-shi, Kanagawa (JP)

(72) Inventor: Soichi Shigeta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/661,350

(22) Filed: Mar. 18, 2015

(65) Prior Publication Data

US 2015/0277957 A1    Oct. 1, 2015

(30) Foreign Application Priority Data

Mar. 31, 2014 (JP) ................................. 2014-071252

(51) Int. Cl.
*G06F 9/455* (2006.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2009/0144305 A1* | 6/2009 | Little | ............... | G06F 17/30079 |
| 2009/0187888 A1* | 7/2009 | Acedo | ................ | G06F 9/445 |
| | | | | 717/120 |
| 2011/0289204 A1* | 11/2011 | Hansson | ............... | G06F 9/5077 |
| | | | | 709/224 |
| 2012/0254443 A1 | 10/2012 | Ueda | | |
| 2013/0239119 A1* | 9/2013 | Garg | .................... | G06F 9/5083 |
| | | | | 718/105 |

FOREIGN PATENT DOCUMENTS

| | | |
|---|---|---|
| JP | 2003-507817 | 2/2003 |
| JP | 2011-523472 | 8/2011 |
| JP | 2012-208781 | 10/2012 |
| WO | WO 01/14987 A2 | 3/2001 |
| WO | WO 2009/117288 A1 | 9/2009 |

* cited by examiner

*Primary Examiner* — Sisley Kim
(74) *Attorney, Agent, or Firm* — Oblon, McClelland, Maier & Neustadt, L.L.P.

(57) ABSTRACT

A scale-out method includes: upon detecting that a processing load of a first virtual machine among one or plural virtual machines exceeds a threshold, deploying a second virtual machine that is a new virtual machine; selecting a process that satisfies a predetermined condition based on processing loads of plural processes operating in the first virtual machine; first specifying first information for identifying first software related to selected process; and setting up the first software on the second virtual machine based on the first information.

7 Claims, 40 Drawing Sheets

| SOFTWARE ID | SOFTWARE NAME | FUNCTION NAME | DEPENDENCE DESTINATION | CALLING DESTINATION | EXCLUSION | SIMULTANEOUSLY | SETUP AUTOMATION DATA NAME | VM ID |
|---|---|---|---|---|---|---|---|---|
| S_01 | AplA | APPLICATION A | S_02 | NONE | NONE | S_02 | apla.rb | VM_101 |
| S_02 | MidP | MIDDLEWARE P | NONE | S_04 | S_05 | NONE | midp.rb | VM_101 |
| S_03 | AplB | APPLICATION B | S_04 | NONE | NONE | S_04 | aplb.rb | VM_101 |
| S_04 | MidQ | MIDDLEWARE Q | NONE | S_05 | S_05 | NONE | midq.rb | VM_101 |
| S_05 | MidR | MIDDLEWARE R | NONE | NONE | S_02,S_04 | NONE | midr.rb | VM_102 |

FIG.13

| VM ID | PHYSICAL SERVER ID | CPU | MEMORY | IP ADDRESS |
|---|---|---|---|---|
| VM_101 | PS_001 | 2GHz*4 | 64GB | 192.168.10.2 |
| VM_102 | PS_002 | 2GHz*2 | 128GB | 192.168.12.5 |

| PROCESS ID | CPU UTILIZATION | AMOUNT OF MEMORY WHICH IS USED | COMMAND NAME |
|---|---|---|---|
| 1234 | 0.1 | 64M | midp |
| 1623 | 0.1 | 300M | midq |
| 1841 | 0.1 | 32M | apla |
| 2057 | 0.6 | 256M | aplb |
| ⋮ | ⋮ | ⋮ | ⋮ |

FIG.16

| NAME OF SETUP AUTOMATION DATA | START-UP SCRIPT NAME |
|---|---|
| midp.rb | /etc/init.d/httpd |
| midq.rb | /opt/local/midq.sh |
| apla.rb | /opt/xxx/bin/apla.sh |
| aplb.rb | /opt/local/bin/aplb.sh |

FIG.17

| START-UP SCRIPT NAME | PROCESS ID |
|---|---|
| /etc/init.d/httpd | 1234 |
| /opt/local/midq.sh | 1623 |
| /opt/xxx/bin/apla.sh | 1841 |
| /opt/local/bin/aplb.sh | 2057 |

FIG.18

| SOFTWARE NAME | SETUP-COMPLETION FLAG |
|---|---|
| MidP | OFF |
| MidQ | OFF |
| AplA | OFF |
| AplB | OFF |

| NAME OF SETUP AUTOMATION DATA | START-UP SCRIPT NAME | PROCESS ID |
|---|---|---|
| midp.rb | /etc/init.d/httpd | 1234 |
| midq.rb | /opt/local/midq.sh | 1623 |
| apla.rb | /opt/xxx/bin/apla.sh | 1841 |
| aplb.rb | /opt/local/bin/aplb.sh | 2057 |

| NAME OF SETUP AUTOMATION DATA | SETUP-COMPLETION FLAG |
|---|---|
| aplb.rb | OFF |
| midq.rb | OFF |

| NAME OF SETUP AUTOMATION DATA | START-UP SCRIPT NAME |
|---|---|
| midp.rb | /etc/init.d/httpd |
| midq.rb | /opt/local/midq.sh |
| apla.rb | /opt/xxx/bin/apla.sh |
| aplb_2.rb | /opt/local/bin/aplb.sh |

```
#INSTALL PACKAGE "aplb_2" VIA yum
yum_package "aplb_2" do
  action :install
end
```
⎫
⎬ ⎯4001
⎭

```
#SET COMMAND THAT IS RECEIVED BY SERVICE "aplb", AND START
service "aplb" do
  supports :restart => true, :reload => true
  action :start
end
```
⎫
⎬ ⎯4003
⎭

```
#USE TEMPLATE TO CREATE SETTING FILE AND SET INITIAL VALUE FOR
EACH VARIABLE
template "/opt/etc/aplb.conf" do
  source "aplb_conf.erb" "
  action :create
  variables(
    :default_username => 'admin'
    :open_timeout => '60'
    :read_timeout => '180'
    :retry => '3'
    :max_sessions = '1024'
  )
```
⎫
⎬ ⎯4005
⎭

```
template "/etc/resolve.conf " do
  source "etc_resolve.conf.erb "
  action :create
  variables(
    :nameservers => ['192.168.1.11','172.24.1.100','172.24.5.3']
    :domain => 'mydomain'
    :search => [ 'mydomain', 'foo.mydomain' ]
  )
end
```
⎫
⎬ ⎯4007
⎭

FIG.40

| SOFTWARE ID | SOFTWARE NAME | FUNCTION NAME | DEPENDENCE DESTINATION | CALLING DESTINATION | EXCLUSION | SIMULTANEOUSLY | NAME OF SETUP AUTOMATION DATA | VM ID |
|---|---|---|---|---|---|---|---|---|
| S_01 | AplC | APPLICATION C | S_02 | NONE | NONE | S_02 | aplc.rb | VM_201 |
| S_02 | MidP | MIDDLEWARE P | NONE | S_06 | S_07 | NONE | midp.rb | VM_201 |
| S_03 | AplD | APPLICATION D | S_06 | NONE | NONE | S_06 | apld.rb | VM_202 |
| S_04 | AplE | APPLICATION E | S_06 | NONE | NONE | S_06 | aple.rb | VM_202 |
| S_05 | AplF | APPLICATION F | S_06 | S_07 | S_07 | S_06 | aplf.rb | VM_202 |
| S_06 | MidQ | MIDDLEWARE Q | NONE | NONE | S_07 | NONE | midq.rb | VM_202 |
| S_07 | MidR | MIDDLEWARE R | NONE | NONE | S_02,S_06 | NONE | midr.rb | VM_203 |

FIG.42

| NAME OF SETUP<br>AUTOMATION DATA | SETUP-COMPLETION<br>FLAG |
|---|---|
| midp.rb | OFF |
| aple.rb | OFF |

| SOFTWARE ID | SOFTWARE NAME | FUNCTION NAME | DEPENDENCE DESTINATION | CALLING DESTINATION | EXCLUSION | SIMULTANEOUSLY | NAME OF SETUP AUTOMATION DATA | VM ID |
|---|---|---|---|---|---|---|---|---|
| S_01 | AplC | APPLICATION C | S_02 | NONE | NONE | S_02 | aplc.rb | VM_301 |
| S_02 | MidP | MIDDLEWARE P | NONE | S_06 | S_07 | NONE | midp.rb | VM_301 |
| S_03 | AplD | APPLICATION D | S_06 | NONE | NONE | S_06 | apld.rb | VM_301 |
| S_04 | AplE | APPLICATION E | S_06 | NONE | NONE | S_06 | aple.rb | VM_301 |
| S_05 | AplF | APPLICATION F | S_06 | NONE | NONE | S_06 | aplf.rb | VM_301 |
| S_06 | MidQ | MIDDLEWARE Q | NONE | S_07 | S_07 | NONE | midq.rb | VM_301 |
| S_07 | MidR | MIDDLEWARE R | NONE | NONE | S_02,S_06 | NONE | midr.rb | VM_302 |

FIG.48

| PROCESS ID | CPU UTILIZATION | AMOUNT OF MEMORY WHICH IS USED | COMMAND NAME |
|---|---|---|---|
| 1235 | 0.1 | 64M | midp |
| 1624 | 0.1 | 300M | midq |
| 1842 | 0.3 | 256M | aplc |
| 2058 | 0.25 | 256M | apld |
| 1784 | 0.1 | 64M | aple |
| 2103 | 0.1 | 64M | aplf |
| ⋮ | ⋮ | ⋮ | ⋮ |

| NAME OF SETUP AUTOMATION DATA | SETUP-COMPLETION FLAG |
|---|---|
| aplc.rb | OFF |
| apld.rb | OFF |
| midp.rb | OFF |
| midq.rb | OFF |

SCALE-OUT METHOD AND SYSTEM

CROSS-REFERENCE TO RELATED APPLICATIONS

This application is based upon and claims the benefit of priority of the prior Japanese Patent Application No. 2014-071252, filed on Mar. 31, 2014, the entire contents of which are incorporated herein by reference.

FIELD

This invention relates to a scale-out technique for virtual machines.

BACKGROUND

During operation of a system that includes virtual machines on which plural processes operate, there is a case that, for example, processing requests to part of the plural processes increase and processing loads of those virtual machines will increase.

In automated scale-out, when an excessive load on any one of virtual machines included in the system is detected, a processing load may be dispersed by adding a new virtual machine that has all functions the same as those of the virtual machine for which the excessive load was detected.

In a certain patent reference, a technique to instantiate a new image of a virtual server when an idle time of the CPU (Central Processing Unit) of the virtual server drops below a reference value is disclosed. Moreover, in the same patent reference, a technique to instantiate a virtual server by using an image that includes software set is also disclosed.

In this way, by preparing an image that corresponds to a virtual machine whose load potentially becomes excessive, and then adding a new virtual machine by using that image when the load of the virtual machine actually becomes excessive, the new virtual machine takes on the same functions as those of the virtual machine whose load became excessive. As a result, part of the processing requests will be treated in the new virtual machine and the excessive load will be reduced.

When this happens, resources are assigned to software installed in the new virtual machine. Therefore, when many kinds of software are included in the image prepared in advance, many resources are required for the new virtual machine. Moreover, in the case that the software does not contribute to dispersion of the processing load, the resources assigned to the software are wasted.

Patent Document 1: Japanese National Publication of International Patent Application No. 2011-523472

Patent Document 2: Japanese Laid-open Patent Publication No. 2012-208781

Patent Document 3: Japanese National Publication of International Patent Application No. 2003-507817

In other words, in conventional arts, there is no technique to enable to reduce consumption of resources in a virtual machine newly deployed.

SUMMARY

A scale-out method relating to one aspect includes: upon detecting that a processing load of a first virtual machine among one or plural virtual machines exceeds a threshold, deploying a second virtual machine that is a new virtual machine; selecting a process that satisfies a predetermined condition based on processing loads of plural processes operating in the first virtual machine; first specifying first information for identifying first software related to selected process; and setting up the first software on the second virtual machine based on the first information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 13 is a diagram depicting an example of a software configuration table;

FIG. 16 is a diagram depicting an example of a process management table;

FIG. 17 is a diagram depicting an example of a first relation table;

FIG. 18 is a diagram depicting an example of a second relation table;

FIG. 40 is a diagram depicting an example of the setup automation data;

FIG. 42 is a diagram depicting an example of the software configuration table relating to the second embodiment;

FIG. 48 is a diagram depicting an example of the software configuration table of the third embodiment;

DESCRIPTION OF EMBODIMENTS

[Embodiment 1]

Figure 1:
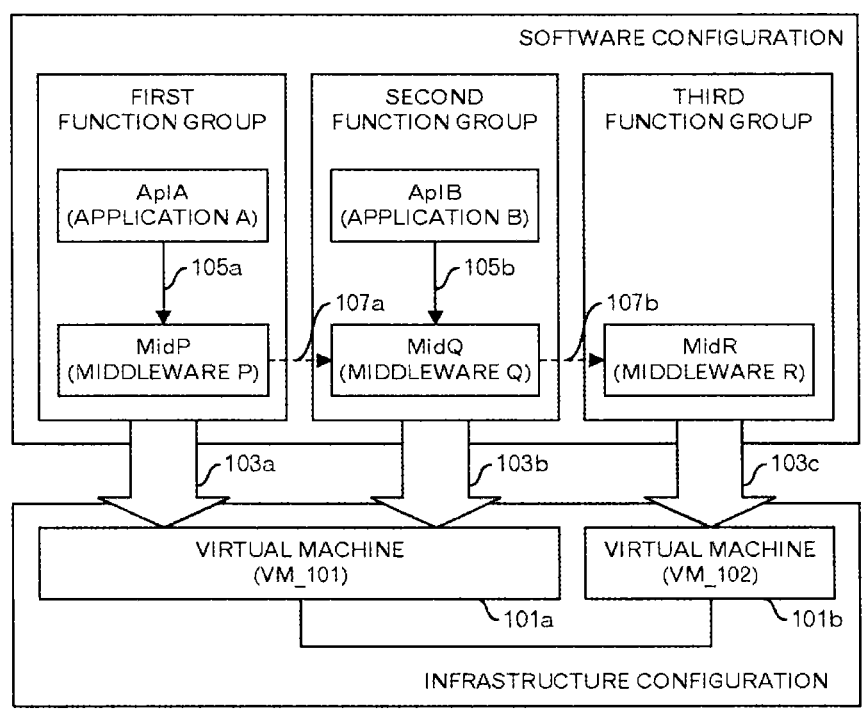
FIG. 1 is a diagram depicting an example of a software configuration and an infrastructure configuration.

First, a summary of this embodiment will be explained. FIG. 1 illustrates an example of a software configuration and an infrastructure configuration. Functions of this system are realized by combining function "application A", function "application B", function "middleware P", function "middleware Q" and function "middleware R".

The upper part of FIG. 1 represents the software configuration for achieving the functions of this system. Hereafter, the term "software" is used to mean "program". Function "application A" is realized by executing a processing of software "AplA" on one of the virtual machines 101. Similarly, function "application B" is realized by executing a processing of software "AplB" on one of the virtual machines 101. Likewise, function "middleware P" is realized by executing a processing of software "MidP" on one of the virtual machines 101. Function "middleware Q" is realized by executing a processing of software "MidQ" on one of the virtual machines 101. Function "middleware R" is similarly realized by executing a processing of software "MidR" on one of the virtual machines 101.

In the following, for convenience of an explanation, software is grouped according to functions. The combination of software "AplA" and software "MidP" is called the first function group. The combination of software "AplB" and software "MidQ" is called the second function group. Software "MidR" is called the third function group. However, it is also possible not to classify the software into function groups.

The lower part of FIG. 1 represents the infrastructure configuration that includes the VMs (Virtual Machines) 101 that are used by the system. The system of this example uses a virtual machine 101a and a virtual machine 101b. As illustrated in FIG. 1, a virtual machine ID for the virtual machine 101a is "VM_101", and a virtual machine ID for the virtual machine 101b is "VM_102". Moreover, a line connecting the virtual machine 101a and the virtual machine 101b represents that the virtual machine 101a and the virtual machine 101b are connected by way of a virtual network.

Large arrows 103 in FIG. 1, in other words, arrows that point the virtual machines 101 from the function groups represent relationships between the virtual machines 101 and the software installed in the virtual machines 101. These relationships mean that resources of those virtual machines 101 are assigned to the software. The large arrow 103a on the left side represents that software "AplA" and software "MidP" that are included in the first function group are installed in the virtual machine 101a. The middle large arrow 103b represents that software "AplB" and software "MidQ" that are included in the second function group are installed in the virtual machine 101a. Moreover, the large arrow 103c on the right side represents that software "MidR" that is included in the third function group is installed in the virtual machine 101b.

Solid arrows 105 in FIG. 1 represent dependence relationships between software. A solid arrow 105a illustrated inside the first function group represents that software "AplA" depends on software "MidP". In this dependence relationship, software "AplA" is a dependence source, and software "MidP" is a dependence destination.

A solid arrow 105b illustrated inside the second function group represents that software "AplB" depends on software "MidQ". In this dependence relationship, software "AplB" is the dependence source, and software "MidQ" is the dependence destination.

Dashed arrows 107 in FIG. 1 represent calling relationships between software. For example, a dashed arrow 107a on the left side represents that software "MidP" calls software "MidQ". In this calling relationship, software "MidP" is a calling source, and software "MidQ" is a calling destination. Similarly, a dashed arrow 107b on the right side represents that software "MidQ" calls software "MidR". In this calling relationship, software "MidQ" is the calling source, and software "MidR" is the calling destination.

The software configuration that is illustrated at the upper part of FIG. 1 corresponds to PaaS (Platform as a Service) and SaaS (Software as a Service) in a cloud environment, for example. Moreover, the infrastructure configuration illustrated at the lower part of FIG. 1 corresponds to IaaS (Infrastructure as a Service) in a cloud environment, for example.

Figure 2:
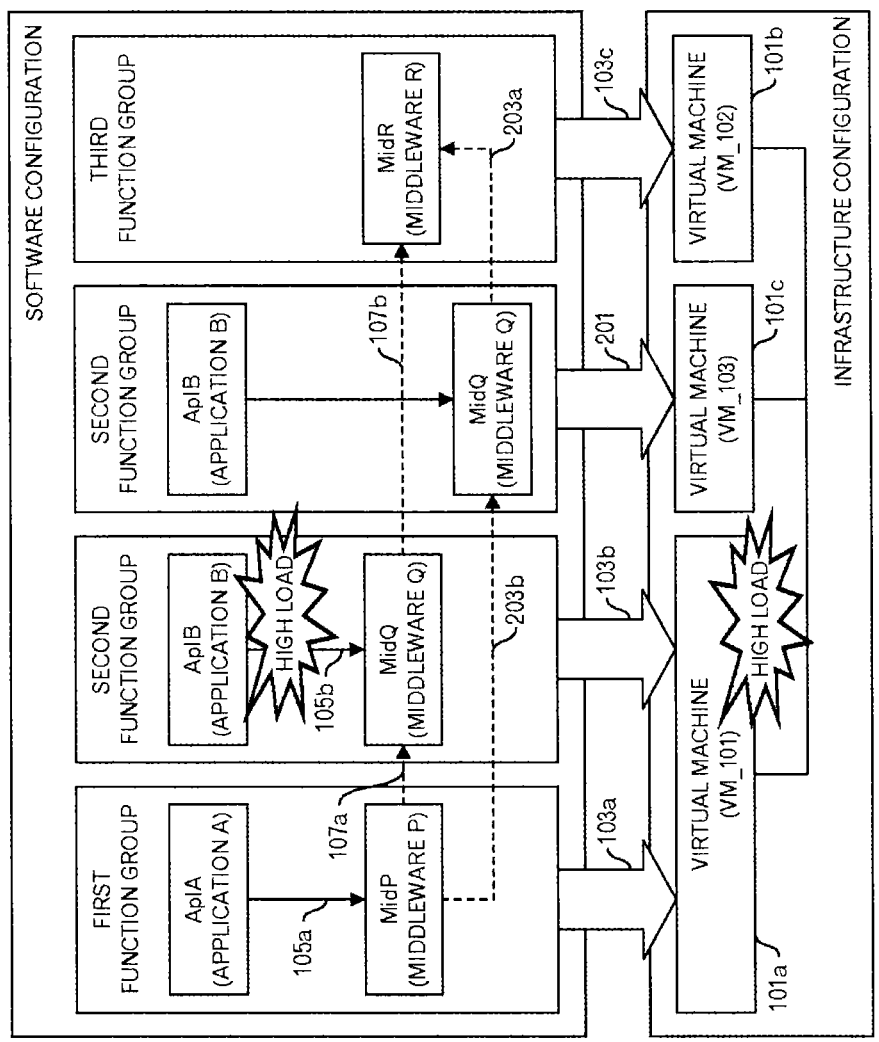
FIG. 2 is a diagram depicting an example of scale-out.

Next, a summary of the scale-out of this embodiment will be explained. FIG. 2 illustrates an example of scale-out. This example is based on the software configuration and infrastructure configuration illustrated in FIG. 1. This example presumes a case where a processing load of a process related to software "AplB" of the software configuration illustrated in FIG. 1 rises in an operation phase, and as a result, a processing load of the virtual machine 101a exceeds a threshold. In other words, the process related to software "AplB" is the main cause of the excessive load of the virtual machine 101a.

In this embodiment, when the virtual machine 101a, whose processing load in an automatic scaling processing exceeds the threshold, is detected, the scale-out is performed. In the scale-out, a virtual machine 101c is added. As illustrated in the figure, a virtual machine ID of the virtual machine 101c is "VM_103".

Part of the software that is installed in the virtual machine 101a is to be installed in the virtual machine 101c. In this example, a processing load of a process related to software "AplB" is high. Therefore, software "AplB" is installed in the virtual machine 101c. In other words, the function of the software for which a processing load is high in the already existing virtual machine 101a is also realized in the new virtual machine 101c.

Moreover, software "AplB" depends on software "MidQ", so software "MidQ" is also installed together in the virtual machine 101c. As a result, as illustrated by the large arrow 201, resources of the virtual machine 101c are assigned to software "AplB" and software "MidQ" that are included in the second function group.

On the other hand, software "AplA" and software "MidP" that are included in the first function group are not installed in the virtual machine 101c. In other words, the resources of the virtual machine 101c are not assigned to software "AplA" and software "MidP". In this way, for functions for which there are sufficient resources for processing capability, resources are not added and assigned to those functions. Therefore, it is possible to effectively use new resources.

As illustrated by the dashed arrow 203a, software "MidQ" that is installed in the virtual machine 101c calls software "MidR" that is installed in the virtual machine 101b, and as illustrated by the dashed arrow 203b, software "MidP" that is installed in the virtual machine 101a calls software "MidQ" that is installed in the virtual machine 101c. Therefore, in the infrastructure configuration, the virtual machine 101c is connected to the virtual machine 101a and the virtual machine 101b by a virtual network.

In FIG. 2, an example is given in which a processing load of a process related to software "AplB" is high, and the software that is included in the second function group is installed in the new virtual machine 101c. However, in the case where a processing load of a process related to software "AplA" becomes high, the software that is included in the first function group is installed in the new virtual machine 101c. Accordingly, in this embodiment, a configuration of software that is installed in the new virtual machine 101c is selected according to a distribution state of the processing load. Therefore, when compared with a method to handle the distribution state of the processing load by preparing images of various patterns corresponding to combinations of the installed software in advance, it is possible to conserve resources.

Moreover, by this embodiment, it is possible to improve processing performance of the system by initially covering many function groups by a small number of the virtual machines 101 and adding only part of the function groups according to an increase in processing requests in the operation phase. Therefore, there are cases in which it is possible to save both the initial resources and additional resources. Furthermore, by suppressing the number of the virtual machines 101 in which the same software is installed, there is also an advantage in that the number of software licenses may be reduced.

Figure 3:
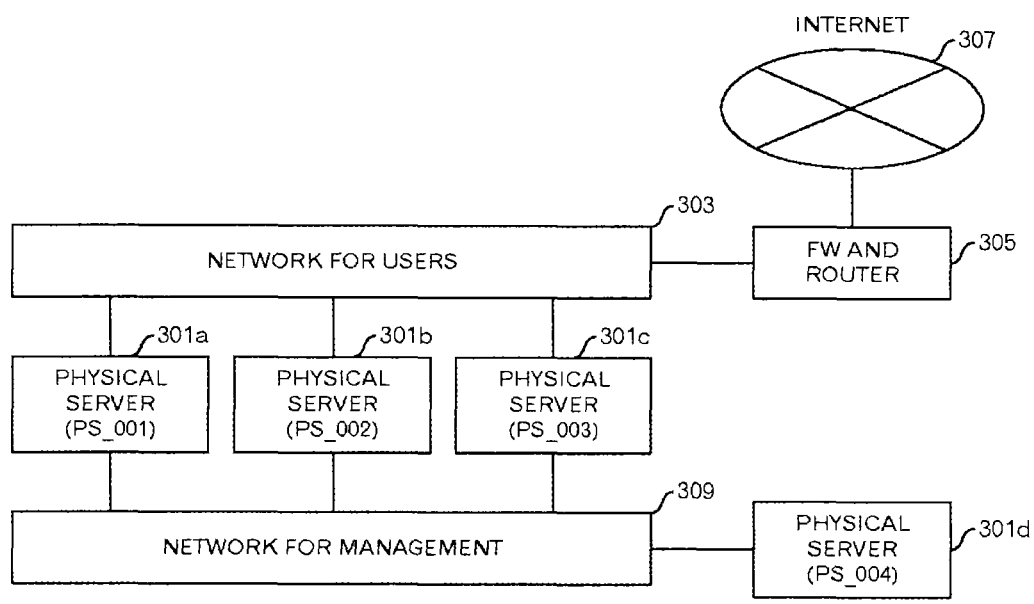
FIG. 3 is a diagram depicting an example of network configuration in a cloud environment.

Next, the network configuration and device configuration will be explained. FIG. 3 illustrates an example of network configuration in the cloud environment. The virtual machines 101 operate on physical servers 301a to 301c. The physical server ID of physical server 301a is "PS_001". The physical server ID of physical server 301b is "PS_002". The physical server ID of physical server 301c is "PS_003".

The physical servers 301a to 301c are connected to a network 303 for users. The network 303 for users is connected to the Internet side by way of a firewall (FW) and router 305. The network 303 for users is used for user communication among the physical servers 301a to 301c, and for user communication between the physical servers 301a to 301c and the Internet side.

The virtual machines 101 that operate on the physical servers 301a to 301c provide services for clients by way of the Internet 307, for example. In other words, the virtual machines 101 that operate on the physical servers 301a to 301c may function as virtual servers.

Moreover, physical servers 301a to 301c are connected by way of a network 309 for management. A physical server 301d is also connected to the network 309 for management. The physical server 301d has a management apparatus that manages the physical servers 301a to 301c. The physical server ID of the physical server 301d is "PS_004".

Figure 4:
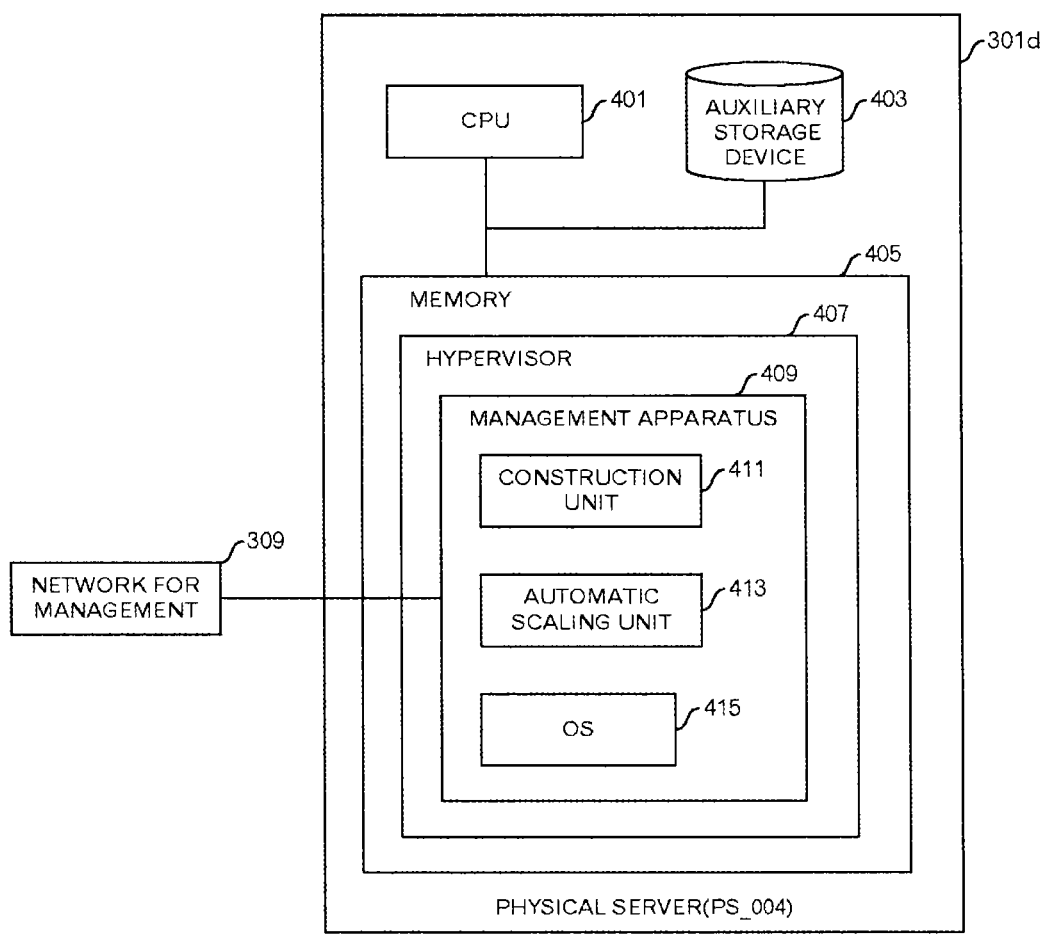
FIG. 4 is a diagram depicting an example of configuration of a physical server having a management apparatus.

Next, the physical server 301d that has a management apparatus will be explained. FIG. 4 illustrates an example of configuration of the physical server 301d having a management apparatus. The management apparatus is a virtualized computer, and is realized in the physical server 301d as illustrated in the figure.

The physical server 301d has a CPU 401, an auxiliary storage device 403, and a memory 405. The CPU 401 performs an arithmetic processing. The auxiliary storage device 403 stores data. A hypervisor 407 is loaded in the memory 405. The management apparatus 409 is controlled by the hypervisor 407. The management apparatus 409 is connected to the network 309 for management. The management apparatus 409 has a construction unit 411, an automatic scaling unit 413, and an OS (Operating System) 415. The construction unit 411 performs a processing for constructing a system. The construction unit 411 will be described later using FIG. 8. The automatic scaling unit 413 performs a processing for automatic scaling. The automatic scaling unit 413 will be described later using FIG. 9.

Figures 52, 53:
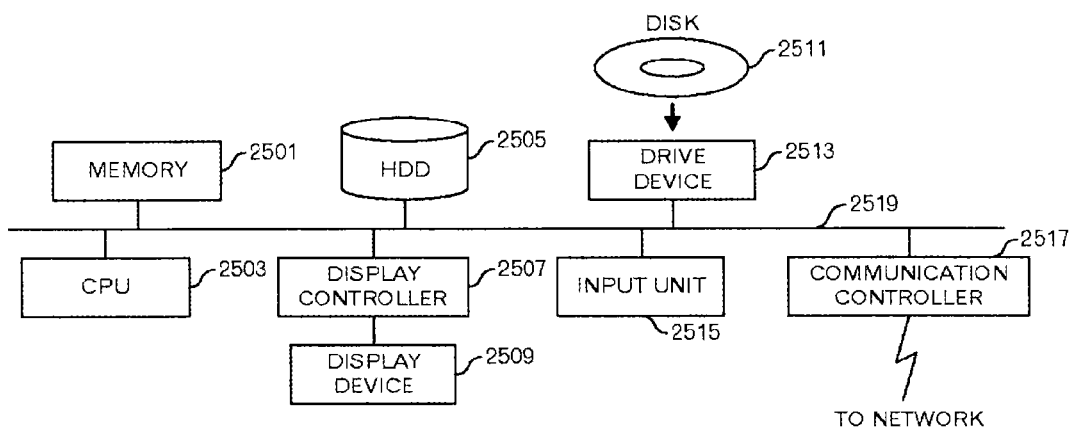
FIG. 52 is a diagram depicting an example of the second list in the third embodiment.
FIG. 53 is a functional block diagram of a computer.

The management apparatus 409, the construction unit 411 and the automatic scaling unit 413 are realized by using hardware resources (for example, see FIG. 4 or FIG. 53). Moreover, the programs that are included in the hypervisor 407, management apparatus 409, construction unit 411, the automatic scaling unit 413 and OS 415 are loaded into a memory (405 in FIG. 4, or 2501 in FIG. 53), for example, and executed in order by the CPU (401 in FIG. 4, or 2503 in FIG. 53).

Figure 5:
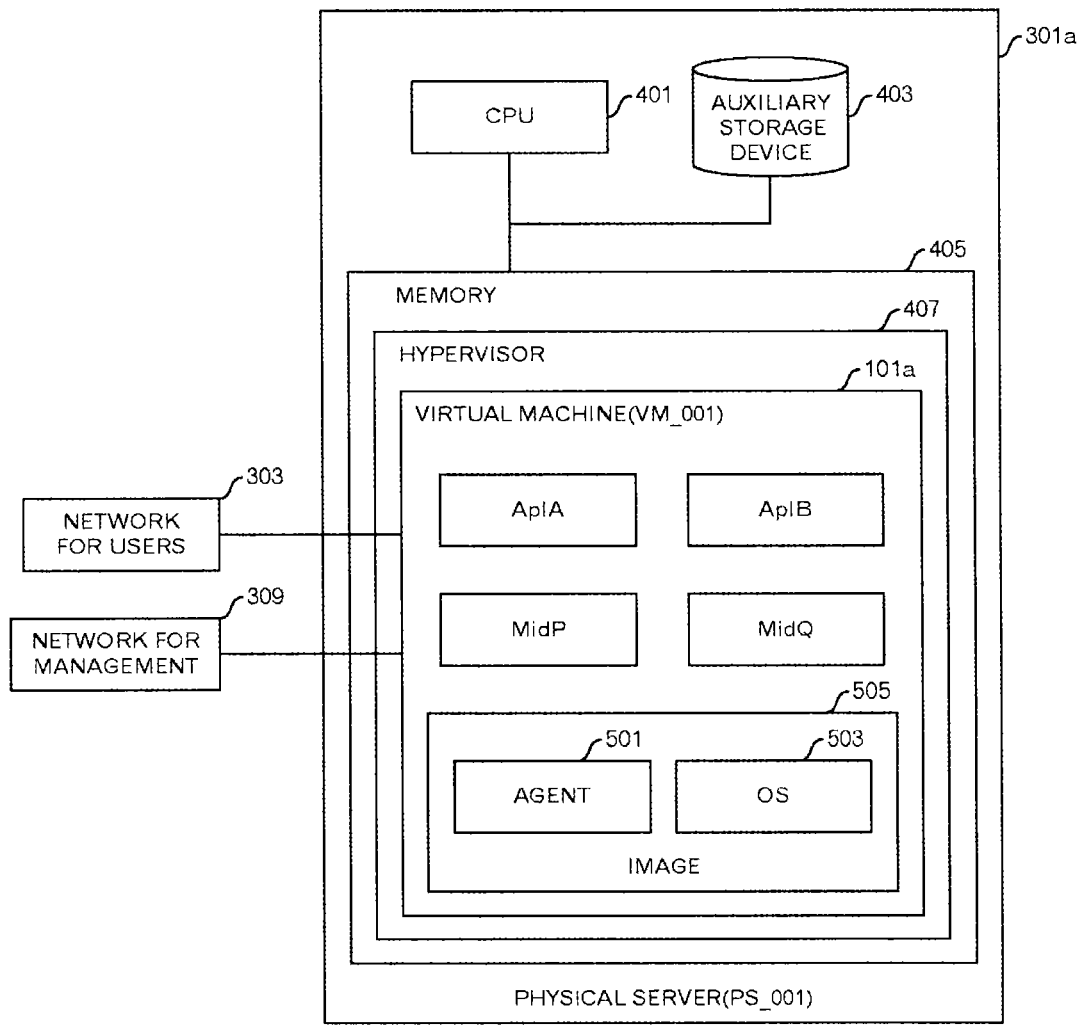
FIG. 5 is a diagram depicting an example of configuration of a physical server that has a virtual machine.

Next, the physical servers 301a to 301c on which the virtual machines 101 operate will be explained. FIG. 5 illustrates a configuration example of the physical server 301a that has the virtual machine 101a. The virtual machine 101a is a virtualized computer, and as illustrated in the figure, is realized by the physical server 301a.

The physical server 301a has a CPU 401, an auxiliary storage device 403, and a memory 405 similarly to the physical server 301d. Moreover, similarly to the physical server 301d, the CPU 401 performs an arithmetic processing. The auxiliary storage device 403 stores data similarly. The hypervisor 407 is loaded in the memory 405 similarly.

The virtual machine 101a is controlled by the hypervisor 407. The virtual machine 101a is connected to the network 303 for users and the network 309 for management.

In the virtual machine 101a, an agent 501 and an OS 503 operate. The agent 501 performs, for example, processings for system construction and automatic scaling for the virtual machine 101a side. The agent 501 and the OS 503 are loaded in the virtual machine 101a in an image format when a virtual machine is deployed. Software for realizing part of the functions of the system (in this example, "AplA", "AplB", "MidP" and "MidQ") is not included in the image and is installed in the virtual machine 101a by the setup.

The virtual machine 101a is realized by using hardware resources (for example, refer to FIG. 5 or FIG. 53). Moreover, software for realizing part of the functions for the hypervisor 407, the virtual machine 101a, and the system, and programs that are included in the agent 501 and the OS 503 are loaded in a memory (405 in FIG. 5, or 2501 in FIG. 53), for example, and executed in order by the CPU (401 in FIG. 5, or 2503 in FIG. 53).

The virtual machine 101 and the management apparatus 409 may also operate on the same physical server 301.

Figure 6:
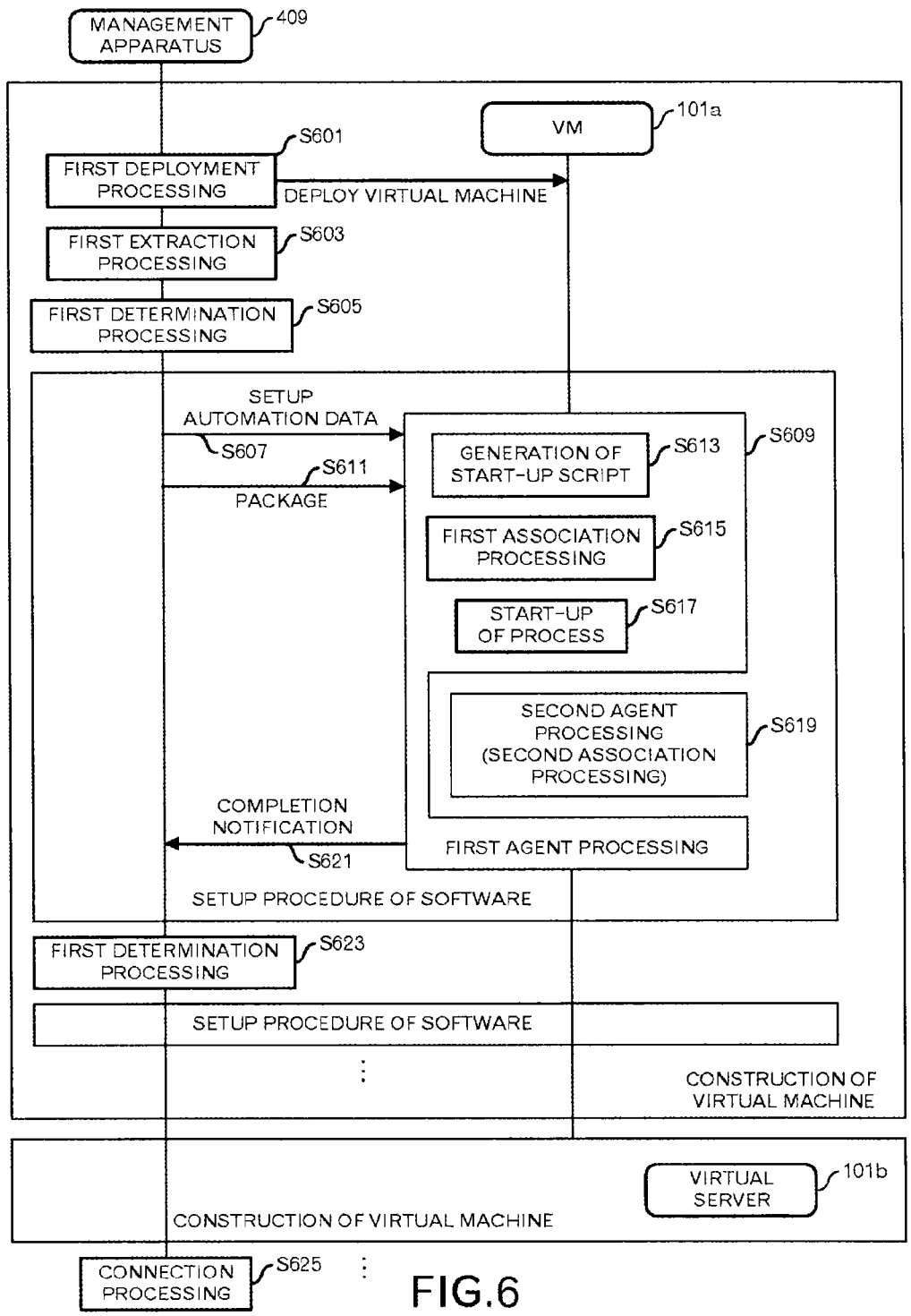
FIG. 6 is a diagram depicting an example of a sequence in a construction phase.

Next, a sequence in the construction phase for constructing the system, and a sequence in the operation phase after the construction phase will be explained in order. FIG. 6 illustrates an example of the sequence in the construction phase. In the construction phase, the management apparatus 409 constructs the virtual machine 101 that will be used in the system, and furthermore constructs the system by connecting the virtual machines 101 by way of the network 303 for users.

First, construction of the virtual machine 101a will be explained. The management apparatus 409 deploys the virtual machine 101a on the physical server 301a in a first deployment processing (S601). The first deployment processing will be explained later using FIG. 19.

Next, the management apparatus 409, in a first extraction processing, extracts software that is installed in the virtual machine 101a from a software configuration table (S603). The first extraction processing will be explained later using FIG. 20.

Next, the management apparatus 409 serially determines, in a first determination processing, software to be set up (S605). For example, as is the case where certain software depends on other software, there are cases in which setting up the other software is a condition for setting up the certain software. In such a case, the management apparatus 409 sets the order for setting up the other software to go before the order for setting up the certain software. The first determination processing will be described later using FIG. 22.

In the procedure below, the management apparatus 409 sets up the software in the virtual machine 101a. First, the management apparatus 409 transmits setup automation data for the software to be set up firstly to the virtual machine 101a (S607).

The setup automation data is data for automating the setup of software. The setup automation data includes instructions for installing a package that includes the software, for example. Moreover, the setup automation data may also include instructions for performing initial settings of the software. The setup automation data, for example, may include instructions for generating a file including settings for software or a file including settings for operating environment. An example of setup automation data will be described later using FIG. 12 and FIG. 40.

The virtual machine 101a receives the setup automation data, and performs a first agent processing (S609). In the first agent processing, the virtual machine 101a installs, according to the setup automation data, a package from the management apparatus 409 that includes the software (S611).

Furthermore, the virtual machine 101a generates, according to the setup automation data, a start-up script for the software (S613). When doing this, the virtual machine 101a, in a first association processing, associates a name of the setup automation data with a start-up script name and stores them (S615). Then, the virtual machine 101a uses the start-up script and starts a process of the software (S617).

Here, the virtual machine 101a, in a second association processing that corresponds to a second agent processing, associates the start-up script name with an ID of the process that was started and stores them (S619). Accordingly, the virtual machine 101a associates, by performing the first association processing (S615) and the second association processing (S619), the name of the setup automation data and the process ID.

After the process described above has been started in the first agent processing (S609), the virtual machine 101a transmits a completion notification to the management apparatus 409 (S621). The first agent processing will be described later using FIG. 24. Moreover, the second agent processing will be described later using FIG. 27. The first agent processing and the second agent processing may also be a single processing.

In this way, after the setup procedure of the software (S607 to S621) ends, the management apparatus 409, in the first determination processing, determines software to be set up next (S623). Then the setup procedure for the next software is executed as described above.

After the software that was extracted in S603 has been set up, the construction of the virtual machine 101a is completed.

In FIG. 6, an example of starting a process during the setup procedure of the software is illustrated, however, it is also possible not to start a process during the setup procedure of the software. In that case, it is also possible to start all processes together after the setup procedure of the software is completed. Moreover, it is also possible to perform the second agent processing in a lump after the setup procedure of the software is completed.

The management apparatus 409 similarly constructs the virtual machine 101b that will be used in the system.

At the end of the construction phase, the management apparatus 409 connects, in a connection processing, the virtual machine 101 in which the calling-source software is installed with the virtual machine 101 in which the calling-destination software is installed by way of a virtual network (S625). The connection processing will be described later using FIG. 23.

Figure 7:
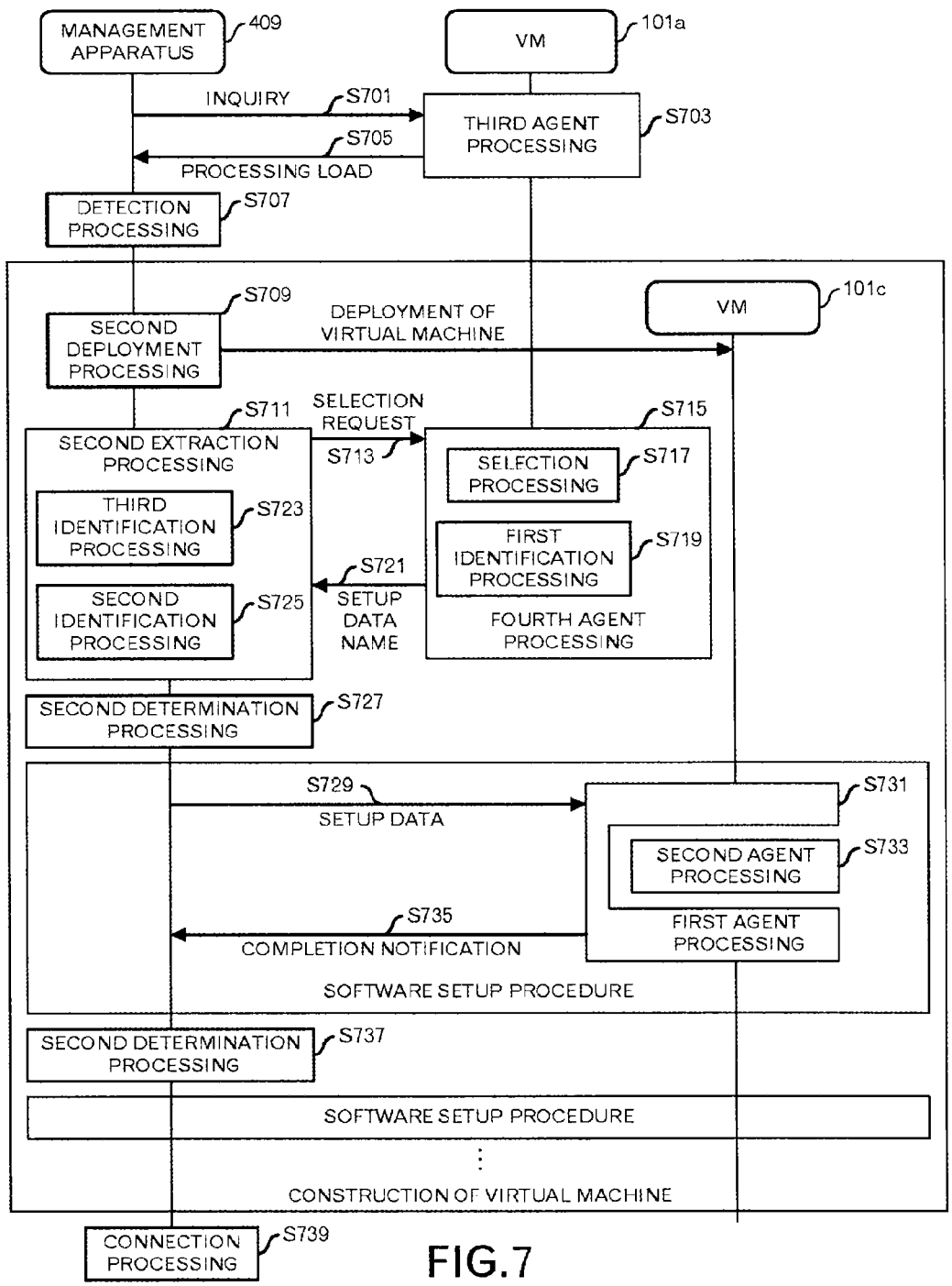
FIG. 7 is a diagram depicting an example of a sequence in an operation phase.

Next, a sequence in the operation phase will be explained. FIG. 7 illustrates an example of the sequence in the operation phase. In the operation phase, the management apparatus 409 monitors the virtual machines 101 that are used in the system. And when a processing load of any of the virtual machines 101 becomes excessive, the management apparatus 409 performs a scale-out processing. In the scale-out processing, a new virtual machine 101 is added.

In order to monitor the virtual machine 101*a*, the management apparatus 409 periodically makes an inquiry to the virtual machine 101*a* about the processing load (S701). When doing this, the management apparatus 409 may also periodically make an inquiry to the hypervisor 407 that controls the virtual machine 101*a* to inquire about the processing load of the virtual machine 101*a*.

After receiving the inquiry, the virtual machine 101*a*, in a third agent processing, measures its own processing load (S703). The virtual machine 101*a* then transmits data representing the processing load to the management apparatus 409 (S705). The third agent processing will be described later using FIG. 35.

The management apparatus 409, in a detection processing, detects one of the virtual machines 101, whose processing load exceeds a predetermined threshold (S707). In this example, it is assumed that the processing load of the virtual machine 101*a* exceeds the predetermined threshold. The detection processing will be described later using FIG. 29. The steps S2901 to S2907 in FIG. 29 correspond to the detection processing.

The management apparatus 409 deploys, in a second deployment processing, the virtual machine 101*c* to be added on the system to the physical server 301*c* (S709). The second deployment processing will be described later using FIG. 30.

Then, the management apparatus 409 extracts, in a second extraction processing, software to be set up in the virtual machine 101*c* from among the software that is installed in the virtual machine 101*a* (S711). Therefore, the management apparatus 409 sends a request to the virtual machine 101*a* to select a process that is the cause for the excessive load of the virtual machine 101*a* (S713).

After receiving the selection request, the virtual machine 101*a*, in a selection processing that is included in a fourth agent processing (S715), selects a process that satisfies a predetermined condition (S717). Furthermore, the virtual machine 101*a* identifies, in a first identification processing that is included in the fourth agent processing (S715), the name of the setup automation data of the software related to the selected process (5719). Then, the virtual machine 101*a* transmits the identified name of the setup automation data to the management apparatus 409 (S721). The fourth agent processing will be described later using FIG. 36.

After receiving the name of the setup automation data, the management apparatus 409 identifies, in a third identification processing (S723) or a second identification processing (S725), software that is to be set up together with the software related to the selected process. In the third identification processing (S723), the software of the dependence source is identified. In other words, the software of the dependence source is also to be set up. In the second identification processing (S725), the software of dependence destination is identified. In other words, the software of the dependence destination is also to be set up. The fourth agent processing will be described later using FIG. 36. In the first embodiment, a second extraction processing (A) that includes the second identification processing (S725) illustrated in FIG. 32 will be explained using FIG. 31. A second extraction processing (B) that includes the third identification processing (S723) will be explained in the second embodiment.

The management apparatus 409 serially determines, in a second determination processing, the setup automation data that is provided for setup (S727). As described in the explanation for the first determination processing (S605 in FIG. 6), when certain software depends on other software, for example, there are cases in which setting up the other software is a condition for setting up the certain software. In such a case, in the second determination processing, the management apparatus 409 sets the order for the setup automation data that is provided for setting up the other software to go before the order for the setup automation data that is provided for setting up the certain software. The second determination processing will be described later using FIG. 34.

In the steps S729 to S735, as is the steps S607 to S621 illustrated in FIG. 6, the setup procedure of the software is executed.

Then, the management apparatus 409 determines the setup automation data provided for the next setup in the second determination processing (S737). Then, the next setup procedure is executed using the setup automation data.

After setup has been completely performed using the setup automation data that was extracted in the step S711, construction of the virtual machine 101*c* is completed.

Lastly, the management apparatus 409 connects, in the connecting processing, the virtual machine 101 in which calling-source software is installed with the virtual machine 101 in which calling-destination software is installed by way of a virtual network (S739).

Figure 8:
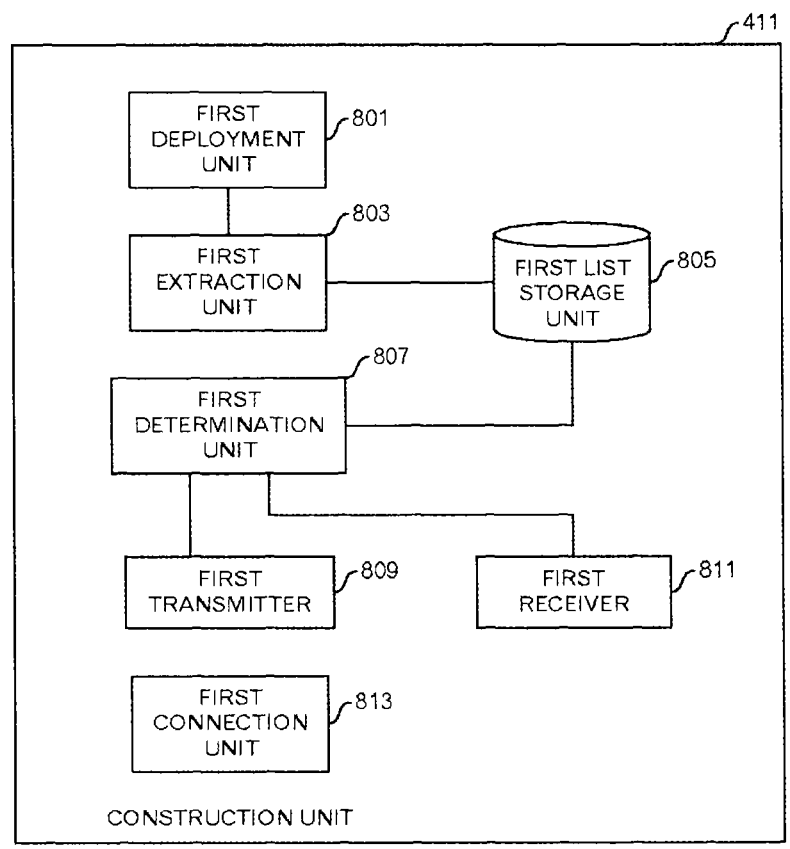
FIG. 8 is a diagram depicting an example of a configuration of a construction unit.

Next, a module configuration will be explained. First, a configuration of the construction unit 411 that is included in the management apparatus 409 will be explained. FIG. 8 illustrates an example of the configuration of the construction unit 411. The construction unit 411 has a first deployment unit 801, a first extraction unit 803, a first list storage unit 805, a first determination unit 807, a first transmitter 809, a first receiver 811 and a first connection unit 813.

The first deployment unit 801 performs the first deployment processing to deploy the virtual machine 101 to the physical server 301. The first extraction unit 803 performs the first extraction processing to extract software that is to be set up in the virtual machine 101 from a software configuration table. The first list storage unit 805 is used for storing a first list of software names of software to be set up. The first determination unit 807 performs the first determination processing to serially determine software that is to be set up. The first transmitter 809 transmits data such as the setup automation data and packages (data that includes object software and is arranged for each time of installation) to the virtual machine 101. The first receiver 811 receives a completion notification for setup, for example, from the virtual machine 101. The first connection unit 813 connects the virtual machine 101 in which calling-source software is installed with the virtual machine 101 in which calling-destination software is installed by way of a virtual network.

The first deployment unit 801, the first extraction unit 803, the first list storage unit 805, the first determination unit 807, the first transmitter 809, the first receiver 811 and the first connection unit 813 are realized by using hardware resources (for example, see FIG. 4 or FIG. 53). Moreover, programs that are included in the first deployment unit 801, the first extraction unit 803, the first determination unit 807, the first transmitter 809, the first receiver 811 and the first connection unit 813 are loaded in a memory (405 in FIG. 4, or 2501 in FIG. 53), for example, and serially executed by the CPU (401 in FIG. 4, or 2503 in FIG. 53).

Figure 9:
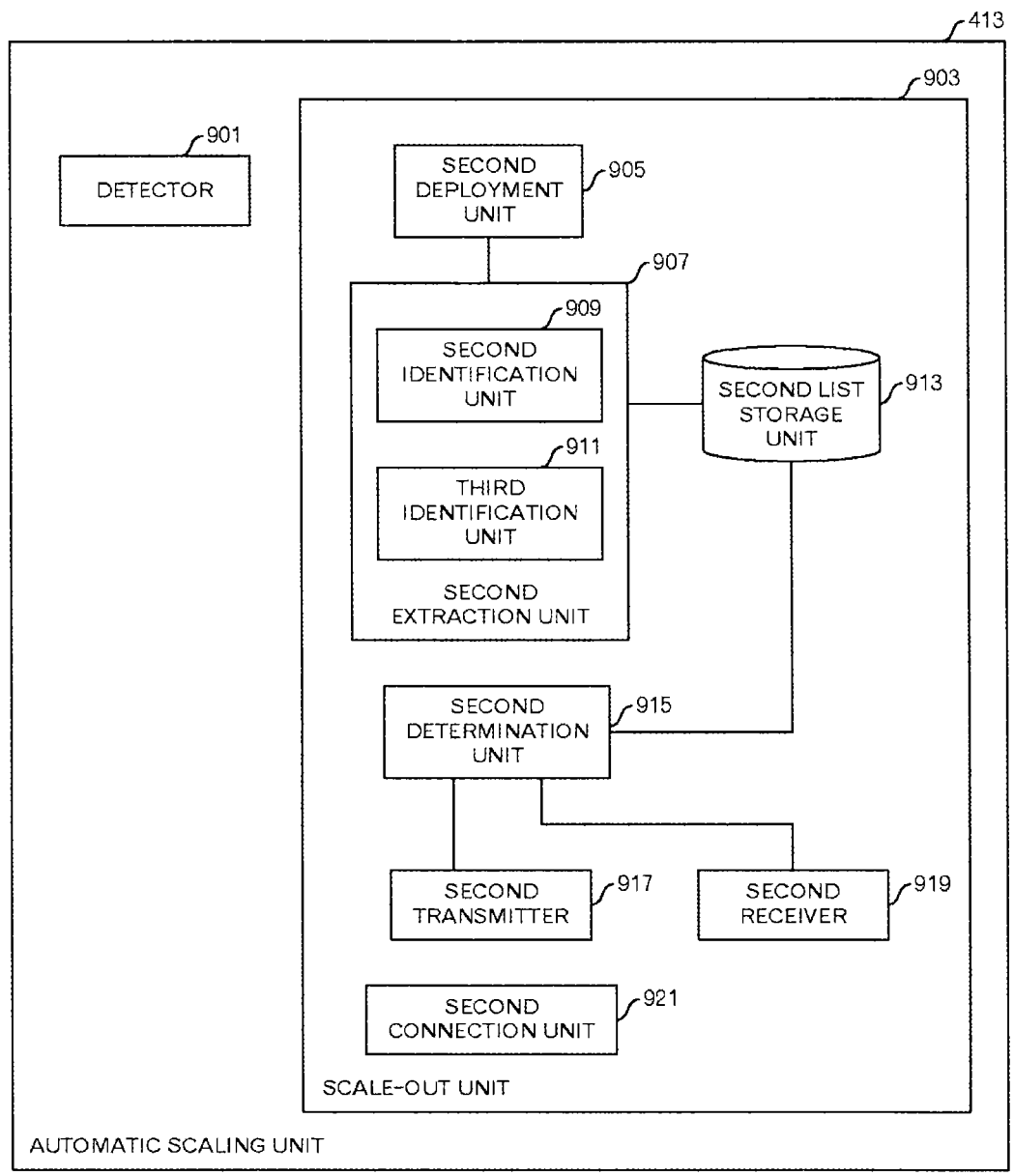
FIG. 9 is a diagram depicting an example of configuration of an automatic scaling unit.

Next, a configuration of the automatic scaling unit 413 that is included in the management apparatus 409 will be explained. FIG. 9 illustrates an example of the configuration of the automatic scaling unit 413. The automatic scaling unit 413 has a detector 901 and a scale-out unit 903. Moreover, the scale-out unit 903 has a second deployment unit 905, a second extraction unit 907, a second list storage unit 913, a second determination unit 915, a second transmitter 917, a second receiver 919, and a second connection unit 921. Furthermore, the second extraction unit 907 includes a second identification unit 909 and a third identification unit 911.

The detector 901 performs the detection processing that detects the virtual machine 101 whose processing load exceeds a threshold. The scale-out unit 903 performs the scale-out processing of adding the virtual machine 101 to the system.

The second deployment unit 905 performs the second deployment processing to deploy a new virtual machine 101 to the physical server 301. The second extraction unit 907 performs the second extraction processing to extract software that is supposed to be set up in the added virtual machine 101 from among software that is installed in the virtual machine 101 having excessive processing load, and identifies the setup automation data for the extracted software. The second identification unit 909 performs the second identification processing to identify setup automation data for dependence destination software. The third identification unit 911 performs the third identification processing to identify the setup automation data for dependence-source software. The second list storage unit 913 is used for storing a second list of the names of the setup automation data of software to be set up. The second determination unit 915 performs the second determination processing to serially determine setup automation data that is to be provided for the setup. The second transmitter 917 transmits data such as setup automation data and packages (data that includes the object software and is arranged for each time of installation) to the virtual machine 101. The second receiver 919 receives a completion notification for setup, for example, from the virtual machine 101. The second connection unit 921 connects the virtual machine 101 in which calling-source software is installed and the virtual machine 101 in which calling-destination software is installed by way of a virtual network.

The detector 901, the scale-out unit 903, the second deployment unit 905, the second extraction unit 907, the second identification unit 909, the third identification unit 911, the second list storage unit 913, the second determination unit 915, the second transmitter 917, the second receiver 919 and the second connection unit 921 are realized by using hardware resources (for example, see FIG. 4 or FIG. 53). Moreover, the programs that are included in the detector 901, the scale-out unit 903, the second deployment unit 905, the second extraction unit 907, the second identification unit 909, the third identification unit 911, the second determination unit 915, the second transmitter 917, the second receiver 919 and the second connection unit 921 are loaded in a memory (405 in FIG. 4, or 2501 in FIG. 53) for example, and serially executed by the CPU (401 in FIG. 4, or 2503 in FIG. 53).

Figure 10:
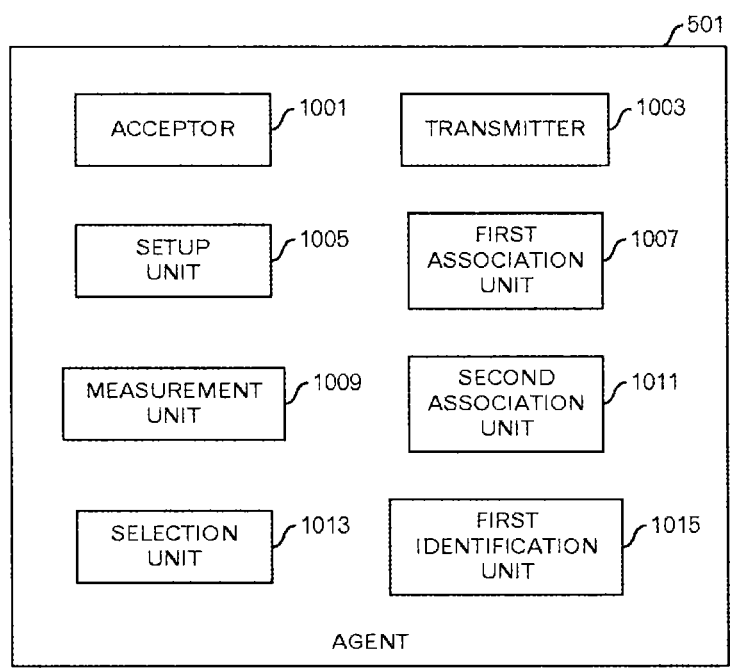
FIG. 10 is a diagram depicting an example of configuration of an agent.

Next, the configuration of an agent 501 that is included in the virtual machine 101 will be explained. FIG. 10 illustrates an example of the configuration of an agent 501. The agent 501 has an acceptor 1001, a transmitter 1003, a setup unit 1005, a first association unit 1007, a measurement unit 1009, a second association unit 1011, a selection unit 1013, and a first identification unit 1015. The setup unit 1005 may also be provided in the virtual machine 101 separate from the agent 501.

The acceptor 1001 accepts data such as setup automation data or selection requests from the management apparatus 409. The transmitter 1003 transmits notifications to the management apparatus 409, for example. The setup unit 1005 performs a processing to set up software. The first association unit 107 performs a processing to associate a name of the setup automation data and a start-up script name. The measurement unit 1009 performs a processing to measure a processing load of the virtual machine 101. The second association unit 1011 performs a processing to associate the start-up script name and the ID of the process that was started. The selection unit 1013 performs a processing to select a process that satisfies a predetermined condition. The first identification unit 1015 performs a processing to identify setup automation data for software that is related to the selected process.

The acceptor 1001, transmitter 1003, setup unit 1005, first association unit 1007, the measurement unit 1009, second association unit 1011, selection unit 1013 and first identification unit 1015 are realized by using hardware resources (for example, see FIG. 5 or FIG. 53). Moreover, programs that are included in the acceptor 1001, transmitter 1003, setup unit 1005, first association unit 1007, the measurement unit 1009, second association unit 1011, selection unit 1013 and first identification unit 1015 are loaded in a memory (405 in FIG. 5, or 2501 in FIG. 53), for example, and serially executed in the CPU (401 in FIG. 5, 2503 in FIG. 53).

Figure 11:
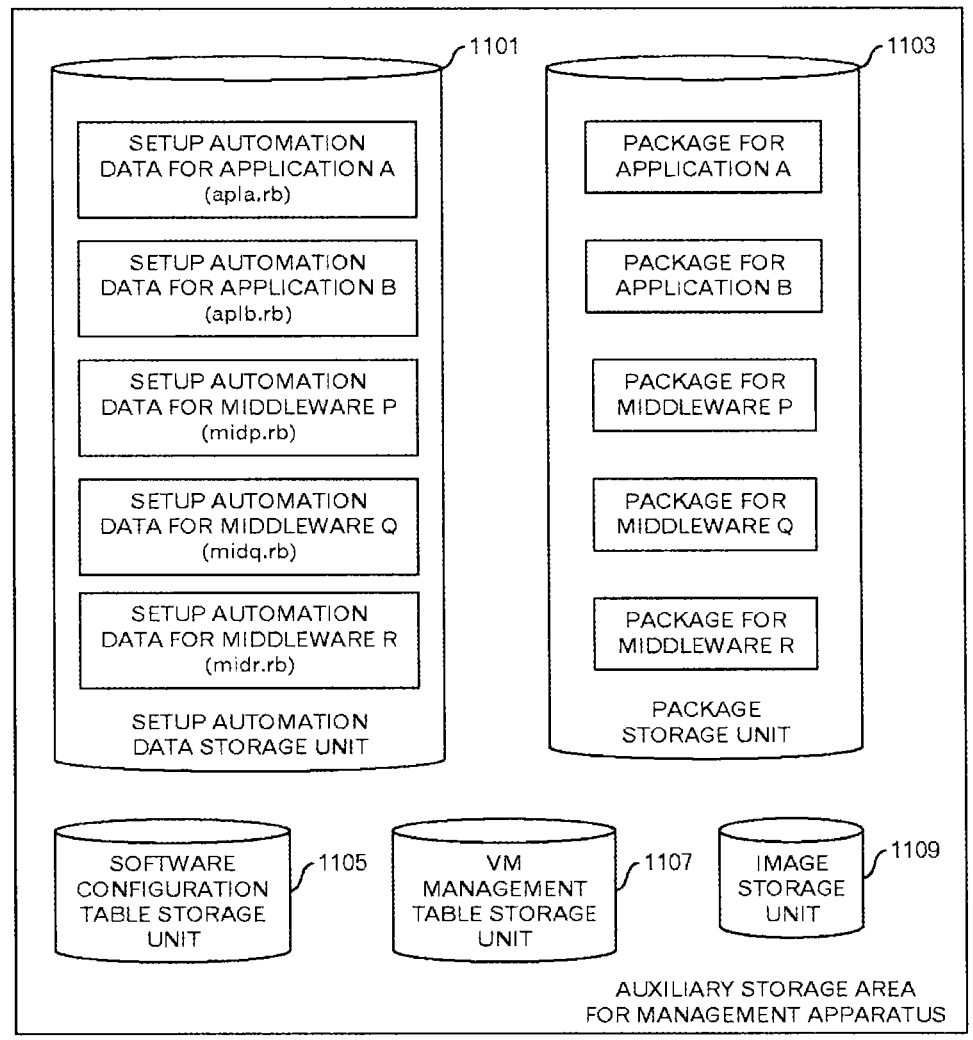
FIG. 11 is a diagram depicting an example of an auxiliary storage area for the management apparatus.

Next, an auxiliary storage area and data that is stored in the auxiliary storage area will be explained. First, the auxiliary storage area for the management apparatus 409 will be explained. FIG. 11 illustrates an example of the auxiliary storage area for the management apparatus 409. The auxiliary storage area for the management apparatus 409 is provided in the auxiliary storage device 403 that is included in any one of physical servers 301, for example. The auxiliary storage area for the management apparatus 409 includes a setup automation data storage unit 1101, a package storage unit 1103, a software configuration table storage unit 1105, a virtual machine management table storage unit 1107, and an image storage unit 1109. The auxiliary storage area for the management apparatus 409 may also be provided in a storage device other than the physical server 301.

The setup automation data storage unit 1101, package storage unit 1103, software configuration table storage unit 1105, virtual machine management table storage unit 1107 and image storage unit 1109 are realized by hardware resources illustrated in FIG. 53, for example.

The setup automation data storage unit 1101 stores in advance setup automation data that corresponds to software for realizing part of the system functions. In this example, the setup automation data storage unit 1101 stores the setup automation data for application A, the setup automation data for application B, the setup automation data for middleware P, the setup automation data for middleware Q and the setup automation data for middleware R. As illustrated in the figure, a file name of the setup automation data for application A is "apla.rb". Similarly, a file name of the setup automation data for application B is "aplb.rb". The file name of the setup automation data for middleware P is "midp.rb". The file name of the setup automation data for middleware Q is "midq.rb". The file name of the setup automation data for middleware R is "midr.rb".

Figure 12:
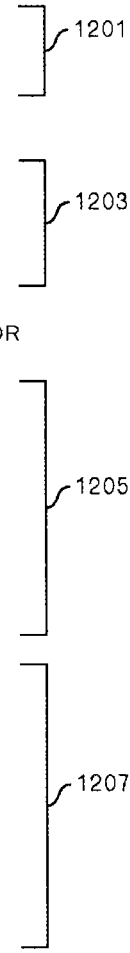
FIG. 12 is a diagram depicting an example of setup automation data.

FIG. 12 illustrates an example of setup automation data. FIG. 12 illustrates an example of setup automation data "aplb.rb" for software "AplB". Instructions to install package "aplb" that includes software "AplB" by using a predetermined package management system are described in a range 1201. Instructions to set a command that is accepted by service "aplb" and start a process is described in a range 1203. Instructions to create a setting file "/opt/etc/ablb.conf" for software "AplB" and set initial values for each variable by using a template "aplb_conf.erb" are described in a range 1205. Instructions to create a setting file "/etc/resolve.conf" for the operating environment and set initial values for each variable by using a template "etc_resolve.conf.erb" are described in a range 1207.

Returning to the explanation of FIG. 11, the package storage unit 1103 stores in advance packages that include software for realizing part of the system functions. In this example, the package storage unit 1103 stores a package for application A (that includes software "AplA"), a package for application B (that includes software "AplB"), a package for middleware P (that includes software "MidP"), a package for middleware Q (that includes software "MidQ"), and a package for middleware R (that includes software "MidR").

The software configuration table storage unit 1105 stores a software configuration table. FIG. 13 illustrates an example of a software configuration table.

The records in this table store data related to specific software. In this example, records have a field for setting a software ID, a field for setting a software name, and a field for setting a software function name.

Moreover, records in this table store data that identifies other software having a predetermined relationship with the software. In this example, records have a field for setting an ID of software that will be the dependence destination, a field for setting an ID of software will be the calling destination, a field for setting an ID of software that is an object of exclusion, and a field for setting an ID of software whose condition is being simultaneously installed in a common virtual machine 101.

Furthermore, records in this table store data related to setup. In this example, records have a field for setting a name of the setup automation data, and a field for setting an ID of the virtual machine 101 where the software is installed.

For example, in a stage for setting the functions of the system, the software ID, the software name, the software function name, ID of software that is the dependence destination, the ID of software that is the calling destination, the ID of software that is an object of exclusion, the ID of software whose condition is being simultaneously installed in a common virtual machine 101, and the name of the setup automation data are set. In a stage in which the virtual machine 101 is assigned to the software, the ID of a virtual machine 101 is set. Therefore, the ID of virtual machine 101 is not always set in the stage in which the system functions are designed. Moreover, the virtual machine 101 is assigned so that the software that is an object of exclusion is not installed on the same virtual machine 101.

Moreover, it is also possible to identify the dependence relationship of the software by providing, in the records of this table, a field for setting the ID of the software that will be the dependence source. Furthermore, it is possible to identify the calling relationship of the software by providing, in the records of this table, a field for setting the ID of the software that will be the calling source.

The example illustrated in FIG. 13 is based on the software configuration that is illustrated in FIG. 1. In the following, the first record will be explained. The first record represents that the software name that is identified by the software ID "S_01" is "AplA", and that the software realizes the function "application A".

Furthermore, the first record represents that the ID of the software that the software depends on is "S_02", and that there is no software that the software calls. In other words, this means that software "AplA" depends on software "MidP", but software "AplA" does not call other software.

Furthermore, the first record represents that there is no software that is an object of exclusion in the software, and that the ID of software whose condition is being simultaneously installed in a common virtual machine 101 is "S_02". In other words, software "MidP" is simultaneously installed in the virtual machine 101 in which software "AplA" is installed. Moreover, it is also possible to simultaneously install arbitrary software in the virtual machine 101 in which software "AplA" is installed.

Furthermore, the first record represents that the name of the setup automation data that is provided for setup of the software is "apla.rb", and that the ID of the virtual machine 101 in which the software is installed is "VM_101".

Next, the second record will be explained. The second record represents that the name of the software that is identified by the software ID "S_02" is "MidP", and that the software realizes the function "middleware P".

Moreover, the second record represents that there is no software that the software depends on, and that the ID of the software that the software calls is "S_04". In other words, this means that software "MidP" does not depend on other software, but software "MidP" calls software "midQ".

Furthermore, the second record represents that the ID of software in the software, which is an object of exclusion, is "S_05", and there is no software whose condition is being simultaneously installed in a common virtual machine 101. In other words, software "MidR" is not installed in the virtual machine 101 where software "MidP" is installed. Moreover, the specific software is not always simultaneously installed in the virtual machine 101 in which software "MidP" is installed.

The second record also represents that the name of the setup automation data that is provided for setup of the software is "midp.rb", and the ID of the virtual machine 101 in which the software is installed is "VM_101".

Next, the third record will be explained. The third record represents that the name of the software that is identified by the software ID "S_03" is "AplB", and that the software realizes the function "application B".

Furthermore, the third record represents that the ID of the software that the software depends on is "S_04", and that the software does not call any software. In other words, this means that software "AplB" depends on software "MidQ", software "AplB" does not call other software.

Furthermore, the third record represents that there is no software in the software that is an object of exclusion, and that the ID of software whose condition is being simultaneously installed in a common virtual machine 101 is "S_04". In other words, software "MidQ" is simultaneously installed in the virtual machine 101 where software "AplB" is installed. Moreover, it is also possible for arbitrary software to be simultaneously installed in the virtual machine 101 where software "AplB" is installed.

Moreover, the third record represents that the name of the setup automation data that is provided for setup of the software is "aplb.rb", and that the ID of the virtual machine 101 where the software is installed is "VM_101".

Next, the fourth record will be explained. The fourth record represents that the name of the software identified by the software ID "S_04" is "MidQ", and that the software realizes the function "middleware Q".

Furthermore, the fourth record represents that there is no software that the software depends on, and that the ID of the software that the software calls is "S_05". In other words, this means that software "MidQ" does not depend on other software, and calls software "MidR".

Moreover, the fourth record represents that the ID of the software in the software, which is an object of exclusion, is "S_05", and that there is no software whose condition is being simultaneously installed in a common virtual machine 101. In other words, software "MidR" is not installed in the virtual machine 101 in which software "MidQ" is installed. Moreover, the specific software is not always simultaneously installed in the virtual machine 101 in which software "MidQ" is installed.

The fourth record also represents that the name of the setup automation data that is provided for setup of the software is "midq.rb", and that the ID of the virtual machine 101 in which the software is installed is "VM_101".

Next, the fifth record will be explained. The fifth record represents that the name of the software identified by the software ID "S_05" is "MidR", and that the software realizes the function "middleware R".

Moreover, the fifth record represents that there is no software that the software depends on, and that there is no software that the software calls. In other words, this means that software "MidR" does not depend on other software, and does not call other software.

Furthermore, the fifth record represents that the IDs of software in the software that are an object of exclusion are "S_02" and "S_04", and that there is no software whose condition is being simultaneously installed in a common virtual machine 101. In other words, software "MidP" and software "MidQ" are not installed in the virtual machine 101 in which software "MidR" is installed. Moreover, the specific software is not always simultaneously installed in the virtual machine 101 in which software "MidR" is installed.

The fifth record also represents that the name of the setup automation data that is provided for the setup of the software is "midr.rb", and that the ID of the virtual machine 101 in which the software is installed is "VM_102".

Software that depends on other software is installed in the same virtual machine 101 as the software that is the dependence destination. Accordingly, the virtual machine 101 in which the software is installed is automatically determined. Therefore, for software for which there exists a dependence destination, setting the ID of the virtual machine may be omitted. In other words, a virtual machine ID may only be set for software for which there is no dependence destination. For example, in the example in FIG. 13, the virtual machine ID of the first record and the virtual machine ID of the third record may not be set. The software configuration table illustrated in this example is also called software topology.

Figures 14, 15:
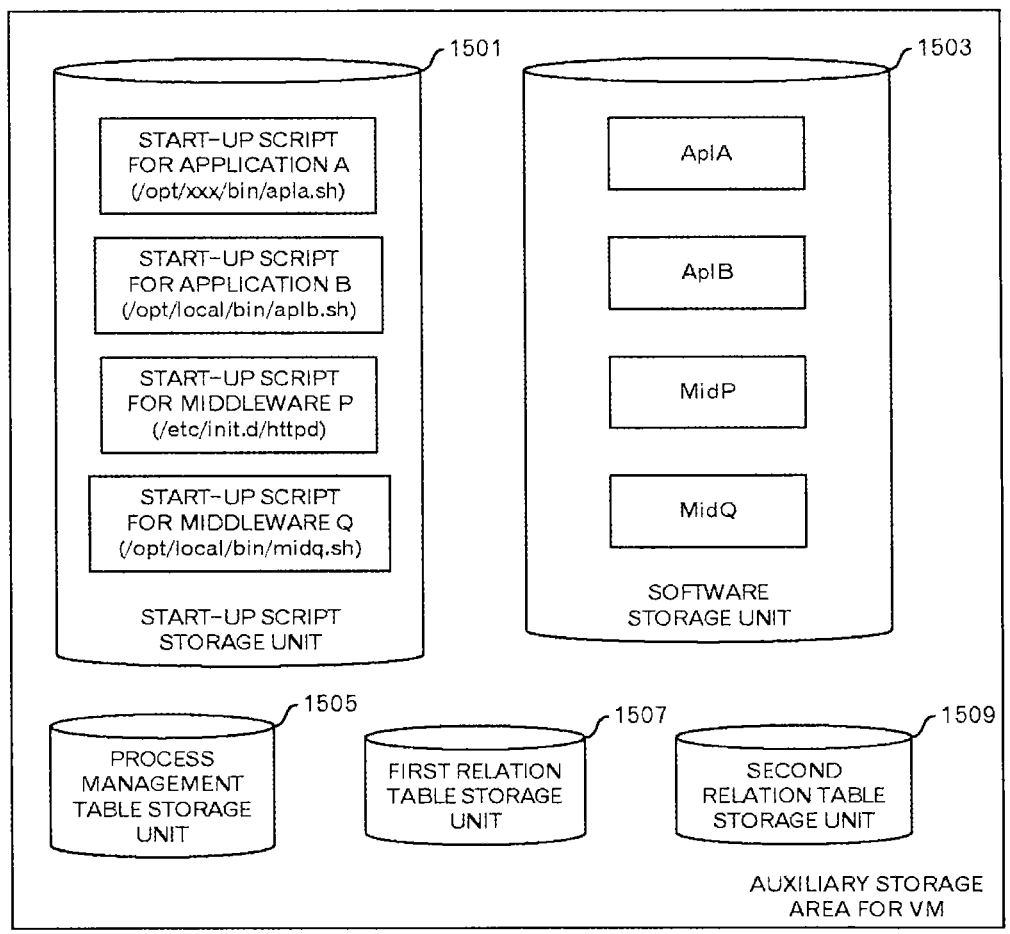
FIG. 14 is a diagram depicting an example of a virtual machine management table.
FIG. 15 is a diagram depicting an example of an auxiliary storage area for a virtual machine.

Returning to the explanation of FIG. 11, the virtual machine management table storage unit 1107 stores a virtual machine management table. FIG. 14 illustrates an example of a virtual machine management table. The virtual machine management table has a record for each of the virtual machines 101 that are included in the system.

The records of this table have a field for setting an ID of the virtual machine 101, a field for setting a physical server ID, a field for setting CPU data, a field for setting memory data and a field for setting an IP address. The physical server ID is the ID of the physical server to which the virtual machine 101 is deployed. The CPU data represents the operating frequency and the number of CPUs that are assigned to the virtual machine 101. The memory data represents the size of the memory that is assigned to the virtual machine 101. The IP address represents the IP address that is assigned to the virtual machine 101.

The first record in this example represents that the virtual machine 101a that is identified by the virtual machine ID "VM_101" is deployed to the physical server 301a that is identified by the physical server ID "PS_001". Furthermore, the first record represents that four CPUs having an operating frequency of "2 GHz" and a memory having a size of "64 GB" are assigned to the virtual machine 101a.

The first record represents that the IP address that is assigned to the virtual machine 101a is "192.168.10.2".

The second record in this example represents that the virtual machine 101b that is identified by the virtual machine ID "VM_102" is deployed to the physical server 301b that is identified by the physical server ID "PS_002". Furthermore, the second record represents that two CPUs having an operating frequency of "2 GHz" and a memory having a size of "128 GB" are assigned to the virtual machine 101b. The second record represents that the IP address that is assigned to the virtual machine 101b is "192.168.12.5".

Returning to the explanation of FIG. 11, the image storage unit 1109 stores in advance an image 505 that is loaded in the virtual machine 101. As illustrated in FIG. 5, the agent 501 and the OS 503 are included in the image 505. Images that are stored in the image storage unit 1109 may include disk images.

Next, the auxiliary storage area for a virtual machine 101 will be explained. FIG. 15 illustrates an example of the auxiliary storage area for a virtual machine 101a. The auxiliary storage area for a virtual machine 101 is provided in an auxiliary storage device 403 that is included in any of physical servers 301. The auxiliary storage area for a virtual machine 101 includes a start-up script storage unit 1501, a software storage unit 1503, a process management table storage unit 1505, a first relation table storage unit 1507 and a second relation table storage unit 1509. The auxiliary storage area for a virtual machine 101 may also be provided in a storage device other than a physical server 301.

The start-up script storage unit 1501, software storage unit 1503, process management table storage unit 1505, first relation table storage unit 1507 and second relation table storage unit 1509 are realized by hardware resources such as illustrated in FIG. 53.

The start-up script storage unit 1501 stores a start-up script for each of the software that is setup in a virtual machine 101. In this example, the start-up script storage unit 1501 stores a start-up script for application A, a start-up script for application B, a start-up script for middleware P and a start-up script for middleware Q. As illustrated in the figure, the file name (including the path) of the start-up script for application A is "/opt/xxx/bin/apla.sh". The file name (including the path) of the start-up script for application B is "/opt/local/bin/aplb.sh". The file name (including the path) of the start-up script formiddleware P is "/etc/init.d/httpd". The filename (including the path) of the start-up script for middleware Q is "/opt/local/bin/midq.sh". FIG. 15 illustrates an example of storing of the files of the start-up scripts in different paths, however, the files of the start-up scripts may also be stored in a common path.

The software storage unit 1503 stores software that is set up in virtual machine 101. In this example, the software storage unit 1503 stores software "AplA" for function "application A", software "AplB" for function "application B", software "MidP" for function "middleware P", and software "MidQ" for function "middleware Q". The software storage unit 1503 may also store other software that is included in an installed package. As mentioned above, the term "software" means a "program".

The process management table storage unit 1505 stores a process management table. FIG. 16 illustrates an example of the process management table. The process management table has a record for each process that is operating on a virtual machine 101.

The records in this table have a field for setting an ID of the process, a field for setting the CPU utilization, a field for setting an amount of the memory which is used, and a field for setting the command name.

The CPU utilization is the ratio of time that the process occupies the CPU in the virtual machine 101. The amount of the memory which is used, is the amount of the memory that the process uses in the virtual machine 101. The command name is the name of the command that starts the process in the virtual machine 101.

The first record in this example represents that the CPU utilization of a process identified by process ID "1234" is "0.1". Moreover, the first record represents that the amount of the memory that is used by the process is "64 M". Furthermore, the first record represents that the process was started by the command "midp".

The second record represents that the CPU utilization of the process identified by process ID "1623" is "0.1". Moreover, the second record represents that the amount of the memory that is used by the process is "300 M". Furthermore, the second record represents that the process was started by the command "midq".

The third record represents that the CPU utilization of the process identified by process ID "1841" is "0.1". Moreover, the third record represents that the amount of the memory that is used by the process is "32 M". Furthermore, the third record represents that the process was started by the command "apla".

The fourth record represents that the CPU utilization of the process identified by process ID "2057" is "0.6". Moreover, the fourth record represents that the amount of the memory that is used by the process is "256 M". Furthermore, the fourth record represents that the process was started by the command "aplb".

In the state of the process illustrated in the figure, when determining a processing load based on CPU utilization, for example, the processing load of the process that is identified by process ID "2057" is high.

Returning to the explanation of FIG. 15, the first relation table storage unit 1507 stores a first relation table that is provided by the first association processing (S615 in FIG. 6). FIG. 17 illustrates an example of a first relation table.

The records in this table have a field for setting the name of the setup automation data, and a field for setting the start-up script name. The start-up script name is the name of the start-up script that is generated by the setup automation data.

In this example, the first record represents that the start-up script "/etc/init.d/httpd" is generated by the setup automation data "midp.rb". The second record represents that the start-up script "/opt/local/midq.sh" is generated by the setup automation data "midq.rb". The third record represents that the start-up script "/opt/xxx/bin/apla.sh" is generated by the setup automation data "apla.rb". The fourth record represents that the start-up script "/opt/local/bin/aplb.sh" is generated by the setup automation data "aplb.rb".

Returning to the explanation of FIG. 15, the second relation table storage unit 1509 stores a second relation table that is provided by the second association processing (S619 in FIG. 6). FIG. 18 illustrates an example of a second relation table. The second relation table has records for each start-up script.

The records in this table have a field for setting the start-up script name, and a field for setting a process ID. The start-up script name includes the path that represents the place of the start-up script file and a file name. A process ID is an ID of a process that was started by the start-up script.

In this example, the first record represents that the process having process ID "1234" was started by the start-up script "/etc/init.d/httpd". Similarly, the second record represents that the process having process ID "1623" was started by the start-up script "/opt/local/midq.sh". The third record represents that the process having process ID "1841" was started by the start-up script "/opt/xxx/bin/apla.sh". The fourth record represents that the process having process ID "2057" was started by the start-up script "/opt/local/bin/aplb.sh".

Figure 19:
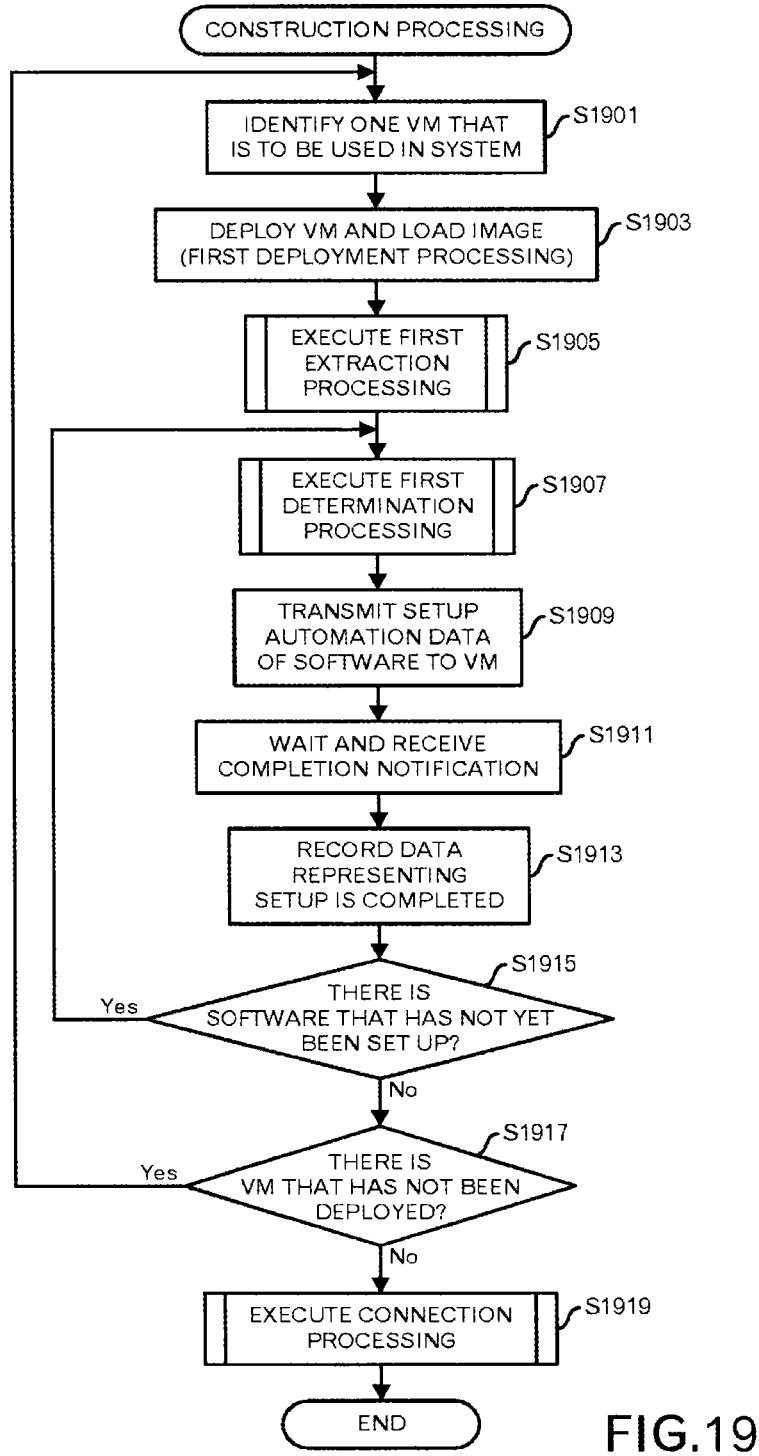
FIG. 19 is a diagram depicting a processing flow of a construction processing.

Next, the processing in the construction phase will be explained. First, the construction processing on the management apparatus 409 side in the construction phase will be explained. FIG. 19 illustrates a processing flow of the construction processing. The first deployment unit 801 identifies one virtual machine 101 that is to be used in the system based on the software configuration table or the virtual machine management table, for example (S1901). The first deployment unit 801 deploys the identified virtual machine 101 on any of physical servers 301. When doing this, the first deployment unit 801 loads an image 505 that includes the agent 501 and the OS 503 in the deployed virtual machine 101 (S1903). The steps S1901 and S1903 described above correspond to the first deployment processing (S601) illustrated in FIG. 6.

The first extraction unit 803 executes the first extraction processing (S1905). The first extraction unit 803 searches, in the first extraction processing, a record in the software configuration table for which the ID of the virtual machine 101 identified in the step S1901 is set. Then, the first extraction unit 803 registers the software name of the detected record in a first list. In the case where plural records are detected, the first extraction unit 803 registers the software name of each record. In doing so, software to be installed in the virtual machine 101 is extracted.

Figures 20, 21:
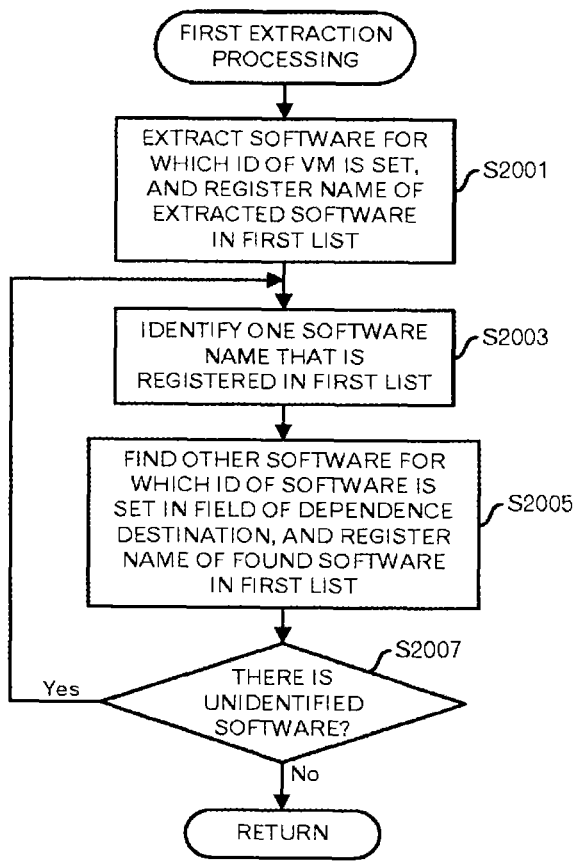
FIG. 20 is a diagram depicting a processing flow of a first extraction processing.
FIG. 21 is a diagram depicting an example of a first list.

However, as described above, in the software configuration table illustrated in FIG. 13, when setting a virtual machine ID for software that depends on other software is omitted, the first extraction unit 803 executes the first extraction processing illustrated in FIG. 20.

The first extraction unit 803 searches a record in the software configuration table for which the ID of the virtual machine 101 identified in the step S1901 is set. Then, the first extraction unit 803 registers the software name that is set for that record in a first list (S2001).

The first extraction unit 803 identifies one software name that is registered in the first list (S2003). For example, software names are serially identified from the start of the first list. The first extraction unit 803 searches a record in which a software ID that corresponds to the software name identified in the step S2003 is set in the field of dependence destination. Then, the first extraction unit 803 registers a software name that is set for that record in the first list (S2005).

The first extraction unit 803 determines whether or not there is unidentified software in the first list (S2007). When it is determined that there is unidentified software, the processing returns to the processing of the step S2003 and repeats the processing described above. When it is determined that there is no unidentified software, the first extraction processing ends, and the processing returns to the step S1907 in FIG. 19.

The software that was registered in the first list in the step S2005 also becomes an object of identification in the step S2003. In doing so, it is also possible to extract software that is indirectly dependent by identifying software that depends on the software that is the dependence source.

FIG. 21 illustrates an example of the first list. The first list has records that are related to software that is to be set up.

The records in this list have a field for setting a name of that software, and a field for a setup-completion flag. When the software has not been set up, the setup-completion flag is set to OFF, and when the software has been set up, the setup-completion flag is set to ON.

In this example the first list represents that software "MidP", software "MidQ", software "AplA" and software "AplB" are to be set up. Moreover, in this stage, it is also represented that none of the software has been set up.

Returning to an explanation of FIG. 19, the software that was extracted in the first extraction processing (S1905) is set up by the processings of the steps S1907 to S1915.

Figure 22:
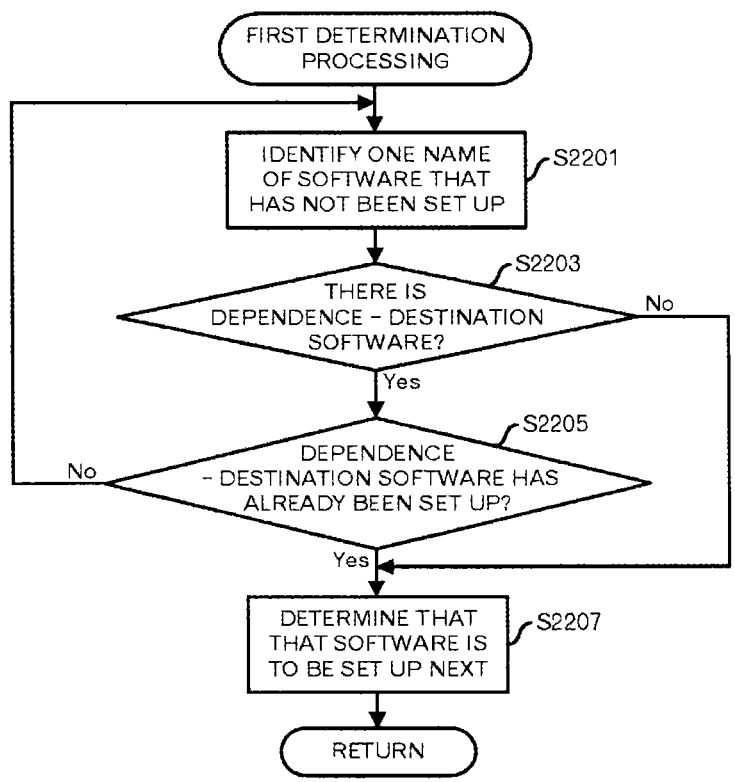
FIG. 22 is a diagram depicting a processing flow of a first determination processing.

The first determination unit 807 executes the first determination processing (S1907). FIG. 22 illustrates a processing flow of the first determination processing. The first determination unit 807 searches records for which the setup-completion flag is set to OFF in the first list, and identifies one name of software that has not been set up (S2201).

The first determination unit 807 determines whether or not there is any software set in the dependence-destination field of a record in the software configuration table, which corresponds to the software name identified in step S2201 (S2203).

When there is no software set in the dependence-destination field of the record that corresponds to the software name that was identified in step S2201, or in other words, when there is no dependence destination software, the first determination unit 807 determines that that software is to be set up next (S2207).

On the other hand, when there is any software set in the dependence destination field of the record that corresponds to the software name that was identified in step S2201, or in other words, when there is dependence destination software, the first determination unit 807 determines whether or not the dependence destination software has already been set up (S2205). More specifically, when ON is set in the setup-completion flag field of the record in the first list that corresponds to the dependence destination software, the first determination unit 807 determines that the dependence destination software has already been set up.

When it is determined that the dependence destination software has not been set up, the processing returns to the step S2201, and the processing described above is repeated. On the other hand, when it is determined that the dependence destination software has been set up, the first determination unit 807 determines that that software is to be set up next (S2207). The first determination processing then ends, and the processing returns to the step S1909 illustrated in FIG. 19.

In step S2203, it is also possible to determine, based on the software configuration table, whether or not there is software whose condition is being simultaneously installed in a common virtual machine 101. It is also possible to treat software whose condition is being simultaneously installed in a common virtual machine 101 in the same way as the dependence destination software.

Returning to the explanation of FIG. 19, the first transmitter 809 transmits setup automation data for the software determined in the first determination processing to the virtual machine 101 that was deployed in the step S1903 (S1909).

The first receiver 811 waits and receives a completion notification from the virtual machine 101 (S1911). After the completion notification is received, the first determination unit 807 records information representing that setup was completed (S1913). In other words, the first determination unit 807 sets a field of the setup-completion flag that corresponds to that software in the first list to ON.

The first determination unit 807 then determines whether or not there is software that has not been set up yet (S1915). When it is determined that there is software that has not been set up yet, the processing returns to the step S1907 and the processing described above is repeated.

On the other hand, when it is determined that there is no software that has not been set up, the first deployment unit 801 determines whether or not there is a virtual machine 101 that has not been deployed (S1917). When it is determined that there is a virtual machine 101 that has not been deployed, the processing returns to step S1901, and the processing described above is repeated.

On the other hand, when it is determined that there is no virtual machine 101 that has not been deployed, the first connection unit 813 executes the connection processing (S1919).

Figure 23:
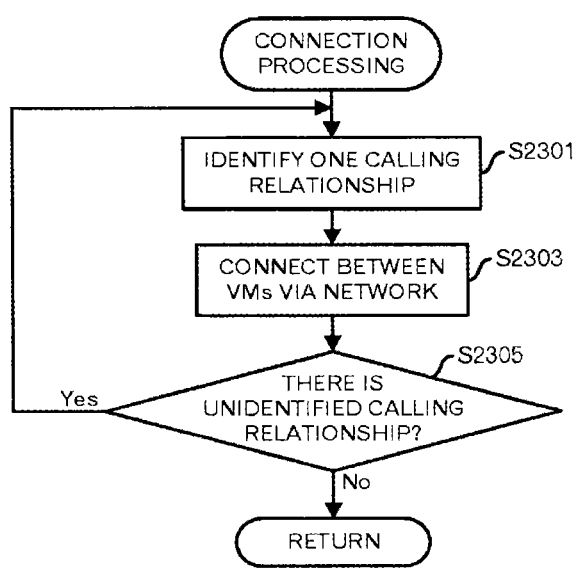
FIG. 23 is a diagram depicting a processing flow of a connection processing.

FIG. 23 illustrates a processing flow of the connection processing. The first transmitter 809 identifies one calling relationship of software operating in the system (S2301). More specifically, when a software ID in any one of records in the software configuration table is set as the calling destination, the first transmitter 809 identifies the calling-source software and the calling-destination software. The first transmitter 809 performs a setting so as to connect the virtual machine 101 in which the calling-source software is installed with the virtual machine 101 in which the calling-destination software is installed via a virtual network (S2303).

The first transmitter 809 then determines whether or not there is an unidentified calling relationship in the software configuration table (S2305). When it is determined that there is an unidentified calling relationship, the processing returns to the step S2301, and the processing described above is repeated. When it is determined that there is no unidentified calling relationship, the connection processing ends, and the processing returns to the processing flow of the construction processing illustrated in FIG. 19. Then, the management apparatus 409 ends the construction processing.

Next, processings on the virtual machine 101 side in the construction phase will be explained. First, the first agent processing (S609 in FIG. 6) on the virtual machine 101 side when setup automation data that was transmitted from the management apparatus 409 in the step S1909 illustrated in FIG. 19 is received will be explained.

Figure 24:
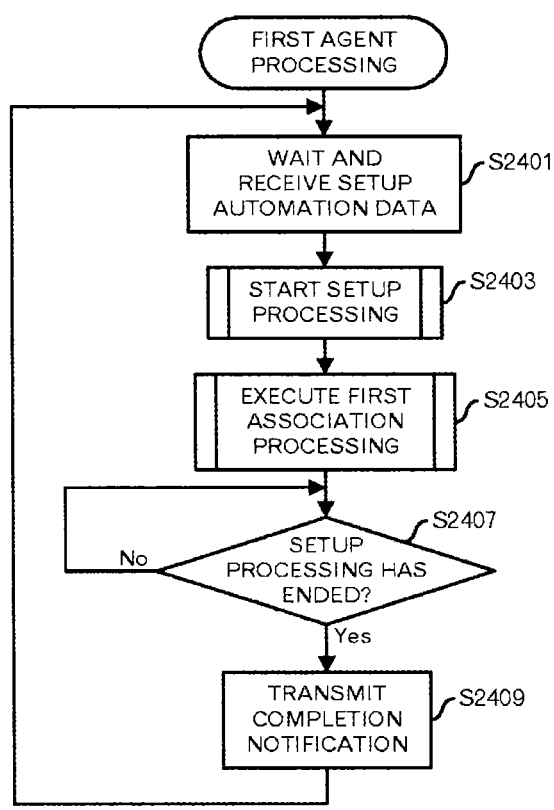
FIG. 24 is a diagram depicting a processing flow of a first agent processing.

FIG. 24 illustrates a processing flow of the first agent processing. The acceptor 1001 that waits and accepts setup automation data from the management apparatus 409 (S2401). After accepting the setup automation data, the agent 501 starts a setup processing by the setup unit 1005 (S2403).

Figure 25:
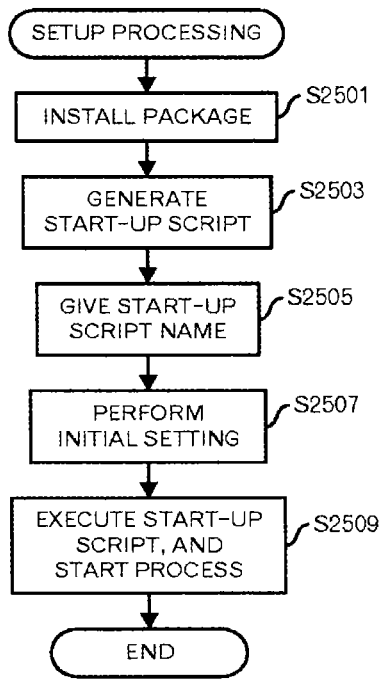
FIG. 25 is a diagram depicting a processing flow of a setup processing.

FIG. 25 illustrates a processing flow of the setup processing. The setup unit 1005 installs a package that was designated in the setup automation data (S2501). That package includes software to be set up. At this time, when an installer is designated in the setup automation data, the setup unit 1005 may also start that installer. In this example, the installer is called the package management system.

At this time, on the management apparatus 409 side, the first transmitter 809 that is included in the construction unit 411 transmits a package. In the case of setup in the operation phase that will be explained later, the second transmitter 917 that is included in the scale-out unit 903 transmits a package.

Returning to the processing on the virtual machine 101 side, the setup unit 1005 generates a start-up script based on the setup automation data (S2503). Then the setup unit 1005 gives the name of the generated start-up script to the first association unit 1007 (S2505). As illustrated in FIG. 17, in this example, a script name in the format of the file name that includes the path is given.

Furthermore, the setup unit 1005 performs initial setting according to an instruction that is included in the setup automation data (S2507). After that, the agent 501 executes the start-up script and starts a process (S2509). After the process has started, the setup unit 1005 ends the setup processing. The setup unit 1005 may perform initial setting after the process has started.

Returning to the explanation of FIG. 24, after the agent 501 started the setup processing in the step S2403, the processing moves to the processing in step S2405 without waiting for the setup processing to end. Then, the first association unit 1007 executes the first association processing (S2405).

Figure 26:
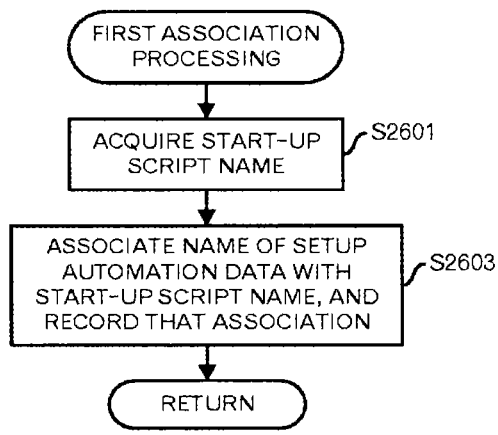
FIG. 26 is a diagram depicting a processing flow of a first association processing.

FIG. 26 illustrates a processing flow of the first association processing. The first association unit 1007 acquires the start-up script name that was given from the setup unit 1005 by the processing of the step S2505 illustrated in FIG. 25 (S2601). The first association unit 1007 associates the name of the setup automation data that was accepted in the processing of the step S2401 illustrated in FIG. 24 with the start-up script name and records that association in the first relation table (S2603). Then, after the first association processing ends, the processing returns to the step S2407 in FIG. 24.

Returning to the explanation of FIG. 24, the agent 501 determines whether or not the setup processing by the setup unit 1005 has ended (S2407). When it is determined that the setup processing by the setup unit 1005 has not ended, the determination processing in the step S2407 is further repeated.

When it is determined that the setup processing by the setup unit 1005 has ended, the transmitter 1003 transmits a completion notification for setup to the management apparatus 409 (S2409). The processing then returns to the standby state in the step S2401.

Figures 27, 28:
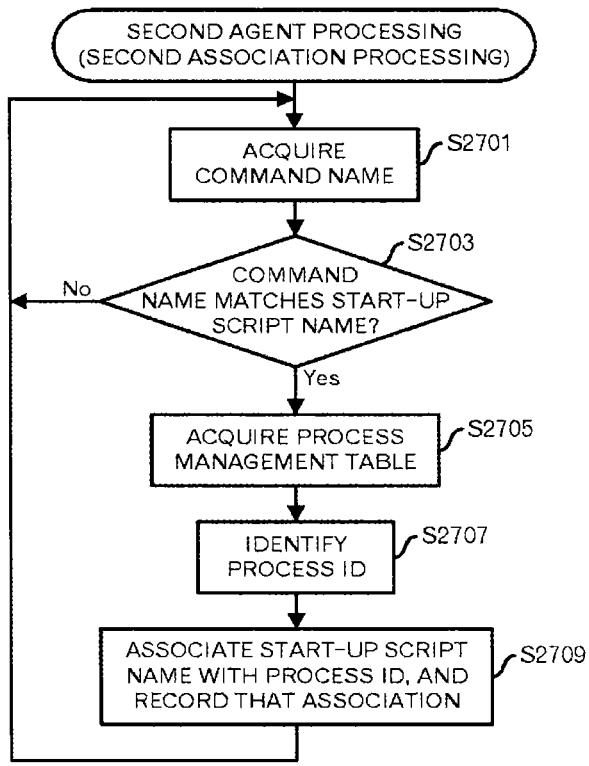
FIG. 27 is a diagram depicting a processing flow of a second agent processing.
FIG. 28 is a diagram depicting an example of a relation table.

Next, the second agent processing (S619 in FIG. 6) to monitor the startup of a process at the step S2509 in FIG. 25 will be explained. FIG. 27 illustrates a processing flow of the second agent processing. The second association unit 1011 acquires a command name from the OS 503 of a newly started process (S2701). When doing this, the second association unit 1011 may acquire the process management table from the OS 503 and identify the newly started process.

The second association unit 1011 determines whether or not the acquired command name matches any one of the start-up script names that are recorded in the first relation table (S2703). In this example, when the command name coincides with a file base name included in the start-up script name, the second association unit 1011 determines that the command name matches the start-up script name. Moreover, in the case where the corresponding relationships between start-up script names and command names are determined beforehand, then when the command name corresponds to a predetermined start-up script name, the second association unit 1011 may also determine that the command name matches the start-up script name.

When it is determined that the acquired command name does not match any of the start-up script names that are recorded in the first relation table, the processing returns to the step S2701 and the processing described above is repeated.

On the other hand, when it is determined that the acquired command name matches any one of start-up script names that are recorded in the first relation table, the second association unit 1011 acquires the process management table from the OS 503 (S2705). When using the acquired process management table that was acquired in the step S2701, it is possible to omit the acquisition processing in the step S2705.

The second association unit 1011 identifies an ID of the newly started process based on the process management table (S2707). Then, the second association unit 1011 associates the start-up script name with the process ID and records the association in the second relation table (S2709).

In the example described above, the second relation table is provided separately from the first relation table, however, it is possible to use a table that integrates the first relation table and second relation table. FIG. 28 illustrates a relation table in which the first relation table and second relation table are integrated. In this example, the records in the relation table have a field for setting a name of the setup automation data, a field for setting a start-up script name and a field for setting a process ID.

In this example, the first record represents that the start-up script "/etc/init.d/httpd" is generated by the setup automation data "midp.rb", and that a process having process ID "1234" was started by that start-up script. Similarly, the second record represents that the start-up script "/opt/local/midq.sh" is generated by the setup automation data "midq.rb", and that a process having process ID "1623" was started by that start-up script. The third record similarly represents that the start-up script "/opt/xxx/bin/apla.sh" is generated by the setup automation data "apla.rb", and that a process having process ID "1841" was started by that start-up script. The fourth record similarly represents that the start-up script "/opt/local/bin/aplb.sh" is generated by the setup automation data "aplb.rb", and that a process having process ID "2057" was started by that start-up script.

Returning to an explanation of FIG. 27, in the processing of step S2709, the second association unit 1011 may also record a process ID in association with the start-up script name in the relation table illustrated in FIG. 28. After the processing of the step S2709 ends, the processing returns to the step S2701.

Next, a processing flow of the operation phase will be explained. First, a processing on the management apparatus 409 side in the operation phase will be explained. In the operation phase, the automatic scaling unit 413 on the management apparatus 409 side executes an automatic scaling processing.

Figure 29:
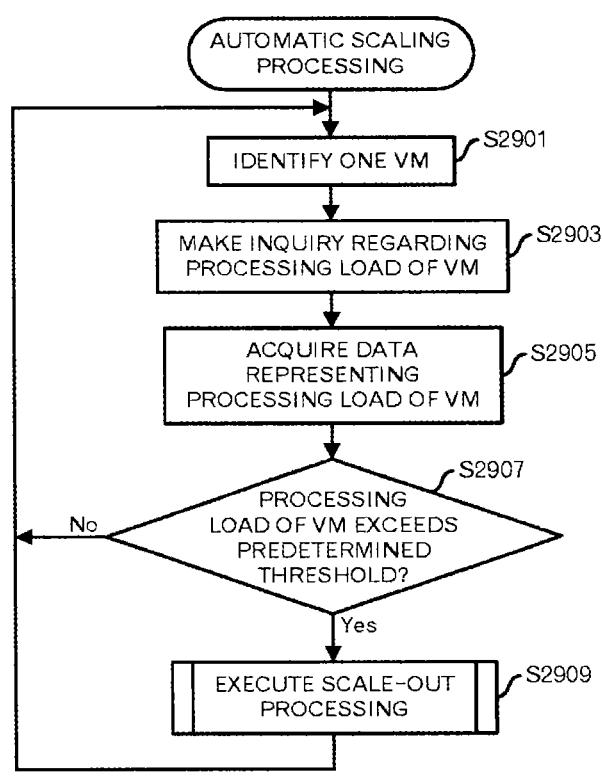
FIG. 29 is a diagram depicting a processing flow of an automatic scaling processing.

FIG. 29 illustrates a processing flow of the automatic scaling processing. The detector 901 identifies one virtual machine 101 that is used in the system based on the software configuration table or the virtual machine management table, for example (S2901). The detector 901 may also identify virtual machines 101 according to a predetermined order, for example. The detector 901 makes an inquiry to the identified virtual machine 101 regarding a processing load of that virtual machine 101 (S2903).

The detector 901 acquires data from the virtual machine 101 that represents the processing load of that virtual machine 101 (S2905), and then determines whether or not the processing load of that virtual machine 101 exceeds a predetermined threshold (S2907). For example, when the CPU utilization of that virtual machine 101 exceeds predetermined utilization, the detector 901 determines that the processing load of that virtual machine 101 exceeds the predetermined threshold. Alternatively, when the ratio of memory usage of the virtual machine 101 exceeds a predetermined ratio of memory usage, the detector 901 may also determine that the processing load of that virtual machine 101 exceeds the predetermined threshold. Alternatively, when the response time of that virtual machine 101 exceeds a predetermined time, the detector 901 may determine that the processing load of that virtual machine 101 exceeds the predetermined threshold. When it is determined that the processing load of that virtual machine 101 does not exceed a predetermined threshold, the processing returns to the step S2901 and the processing described above is repeated.

When it is determined that the processing load of that virtual machine 101 exceeds the predetermined threshold, the scale-out unit 903 executes a scale-out processing (S2909). The steps S2901 to S2907 described above correspond to the detection processing (S707 in FIG. 7).

Figure 30:
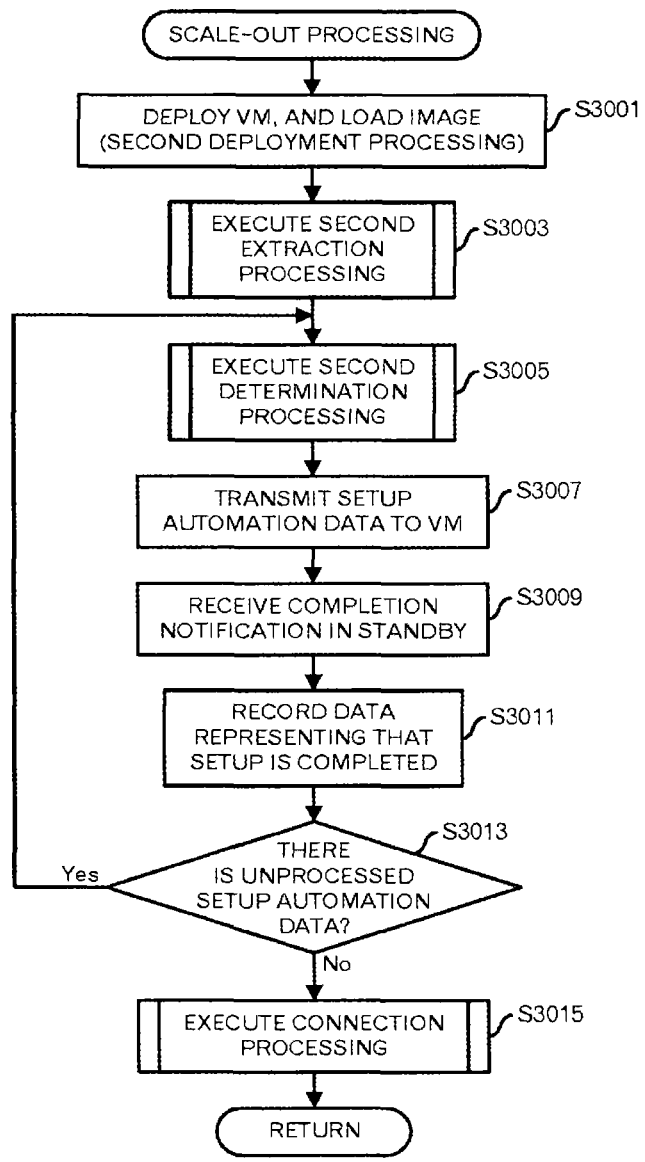
FIG. 30 is a diagram depicting a processing flow of a scale-out processing.

FIG. 30 illustrates a processing flow of the scale-out processing. The second deployment unit 905 deploys a new virtual machine 101 on any of the physical servers 301. When doing this, the second deployment unit 905 loads an image 505 that includes the agent 501 and the OS 503 in the deployed virtual machine 101 (S3001). The processing in the step S3001 corresponds to the second deployment processing illustrated in FIG. 7 (S709).

The second extraction unit 907 executes the second extraction processing (S3003). The second extraction unit 907 extracts, in the second extraction processing, software to be newly set up from among software that is installed in a virtual machine 101 for which it was determined in the step S2907 in FIG. 29 that the processing load exceeds the predetermined threshold, or in other words, that is installed in an overloaded virtual machine 101, and identifies setup automation data for that extracted software.

Figures 31, 32:
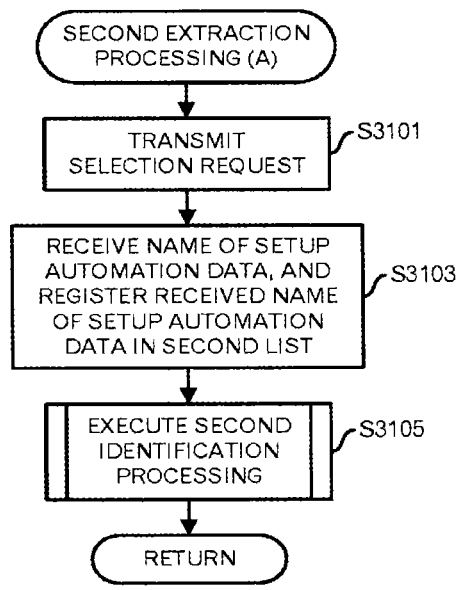
FIG. 31 is a diagram depicting a processing flow of a second extraction processing (A)
FIG. 32 is a diagram depicting an example of a second list.

FIG. 31 illustrates a processing flow of the second extraction processing (A). The second extraction unit 907 transmits a selection request to the overloaded virtual machine 101 (S3101). The selection request is a request for causing the overloaded virtual machine 101 to select software related to a process satisfying a predetermined condition.

The second extraction unit 907 receives, from the overloaded virtual machine 101, a name of the setup automation data for the software related to the a process satisfying the predetermined condition, and registers the received name of the setup automation data in the second list (S3103).

FIG. 32 illustrates an example of the second list. The second list has records regarding the setup automation data that is to be provided for setup of the added virtual machine 101.

The records in this list have a field for setting a name of the setup automation data, and a field for a setup-completion flag. When setup by the setup automation data has not been performed, OFF is set for the setup-completion flag, and when setup by the setup automation data has been performed, ON is set for the setup-completion flag.

In this example, the second list represents that setup automation data "aplb.rb" and setup automation data "midq.rb" are to be provided for setup. Moreover, the second list represents that in this stage, there is no setup automation data that has already been provided for setup.

Returning to an explanation of FIG. 31, the second identification unit 909 executes the second identification processing (S3105). The second identification unit 909 identifies, in the second identification processing, setup automation data for software that corresponds to the software dependence destination that was selected by the overloaded virtual machine 101.

Figure 33:
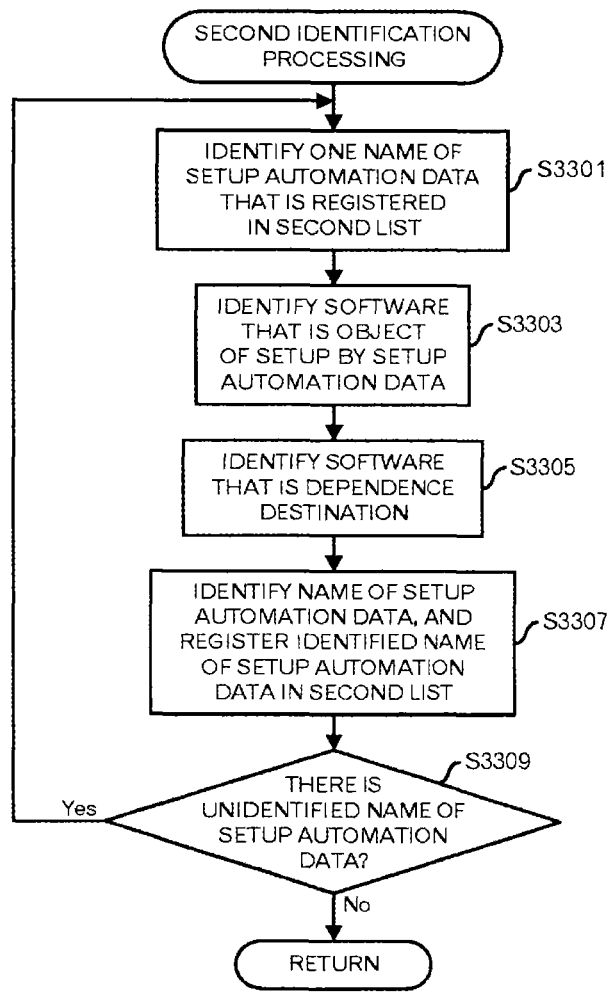
FIG. 33 is a diagram depicting a processing flow of a second identification processing.

FIG. 33 illustrates a processing flow of the second identification processing. The second identification unit 909 identifies one name of the setup automation data that is registered in the second list (S3301). The second identification unit 909 uses the software configuration table to identify software that is the object of setup by that setup automation data (S3303).

The second identification unit 909 uses the software configuration table to identify software that the software selected in the step S3303 depends on, or in other words the software that is the dependence destination (S3305). Furthermore, the second identification unit 909 uses the software configuration table to identify a name of the setup automation data for the software that is the dependence destination, and registers the identified name of the setup automation data in the second list (S3307).

The second identification unit 909 determines whether or not there is an unidentified name of the setup automation data in the second list (S3309). When there is an unidentified name of the setup automation data, the processing returns to S3301 and the processing described above is repeated.

Here, the name of the setup automation data that was registered in the step S3307 is determined in the step S3309 as being unidentified, and becomes the object of identification in the step S3301. In this way, it is possible to also identify software that the dependence-destination software depends on, or in other words, software on which the software is indirectly dependent.

In the step S3309, when it is determined that there is no unidentified name of the setup automation data, the second identification processing ends, and the processing returns to the second extraction processing (A) illustrated in FIG. 31. Furthermore, the second extraction processing (A) also ends, and the processing returns to the step S3005 in FIG. 30.

Figure 34:
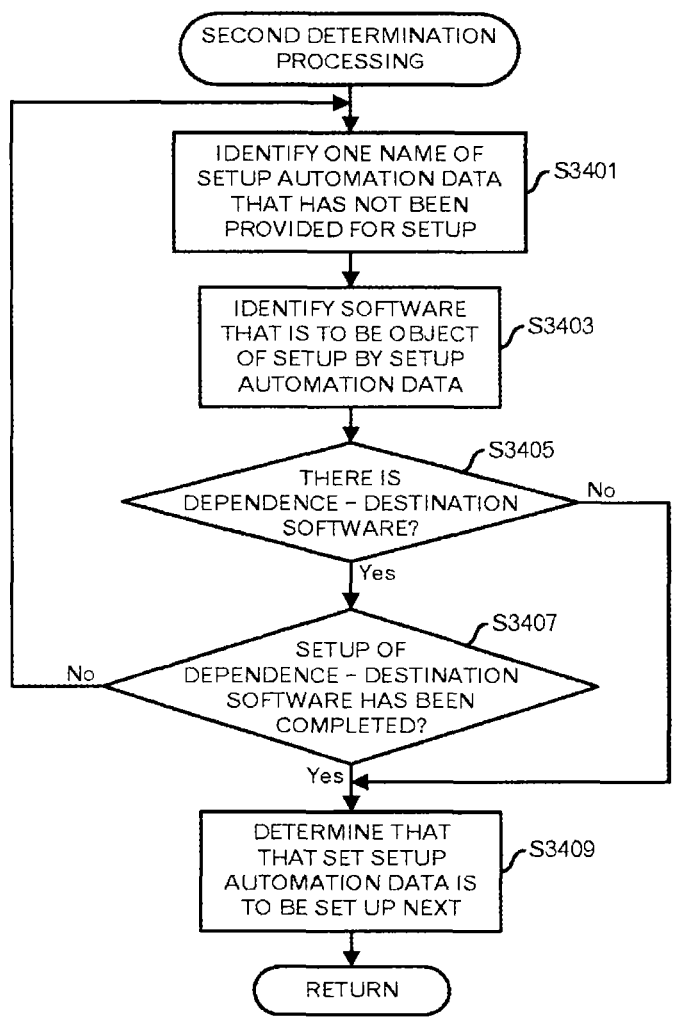
FIG. 34 is a diagram depicting a processing flow of a second determination processing.

Returning to the explanation of FIG. 30, the second determination unit 915 executes the second determination processing (S3005). FIG. 34 illustrates a processing flow of the second determination processing. The second determination unit 915 searches records in the second list for which the setup-completion flag field is set to OFF, and identifies one name of setup automation data that has not been provided for setup (S3401). The second determination unit 915 uses the software configuration table to identify software that is to be the object of setup by the setup automation data (S3403).

The second determination unit 915 determines whether or not any software is set in the dependence-destination field of the record in the software configuration table, which corresponds to the software that was identified in the step S3403 (S3405).

When there is no software set in the dependence-destination field of the record that corresponds to the software identified in the step S3403, in other words, when there is no dependence-destination software, the second determination unit 915 determines that setup automation data is to be provided for setup next (S3409).

On the other hand, when there is software set in the dependence-destination field of the record that corresponds to the software that was identified in the step S3403, or in other words, when there is the dependence-destination software, the second determination unit 915 determines whether or not setup of the dependence-destination software has been completed (S3407). More specifically, when ON is set in the field of the setup-completion flag for the record that corresponds to the setup automation data of the dependence-destination software in the second list, the second determination unit 915 determines that setup of the dependence-destination software has been completed.

When it is determined that setup of the dependence-destination software is not completed, the processing returns to the step S3401 and the processing described above is repeated. On the other hand, when it is determined that setup of the dependence-destination software is completed, the second determination unit 915 determines that setup automation data is to be provided for setup next (S3409). Then, the second determination processing ends, and the processing returns to the step S3007 illustrated in FIG. 30.

It is also possible in the step S3405 to determine, based on the software configuration table, whether or not there is software whose condition is being simultaneously installed in a common virtual machine 101. Software whose condition is being simultaneously installed in a common virtual machine 101 may be handled similarly to the dependence-destination software.

Returning to the explanation of FIG. 30, the second transmitter 917 transmits, to the virtual machine 101 that was deployed in the step S3001, the setup automation data that was determined in the second determination processing (S3005) to be next in order (S3007).

The second receiver 919 waits and receives a completion notification (S3009). After receiving the completion notification, the second determination unit 915 records information representing that setup was completed (S3011). In other words, the second determination unit 915 sets ON for the field of the setup-completion flag corresponding to that setup automation data in the second list.

The second determination unit 915 determines whether or not there is still setup automation data that has not been provided for setup (S3013). When it is determined that there is still setup automation data that has not been provided for setup, the processing returns to the step S3005, and the processing described above is repeated.

On the other hand, when it is determined that there is no setup automation data that has not been provided for setup, the second connection unit 921 executes the connection processing (S3015). The connection processing by the second connection unit 921 is the same as the connection processing (FIG. 23) by the first transmitter 809 described above. However, the processing for network connection at the step S2303 is performed only for the calling relationships, among calling relationships identified in the step S2301, for which the software extracted in the step S3003 illustrated in FIG. 30 correspond to the calling source or the calling destination.

Next, the processing on the virtual machine 101 side in the operation phase will be explained. First, the third agent processing (S703 in FIG. 7) on the virtual machine 101 side performed in response to the inquiry from the management apparatus 409 illustrated at the step S2903 in FIG. 29 will be explained.

Figure 35:
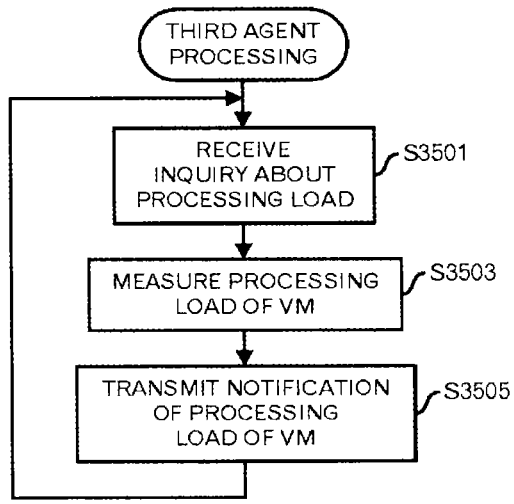
FIG. 35 is a diagram depicting a processing flow of a third agent processing.

FIG. 35 illustrates a processing flow of the third agent processing. The acceptor 1001 accepts an inquiry about the processing load from the management apparatus 409 (S3501). After accepting the inquiry about the processing load, the measurement unit 1009 measures the processing load of its own virtual machine 101 (S3503).

When using the CPU utilization of the virtual machine 101 as the processing load, for example, the measurement unit 1009 acquires the CPU utilization of the own virtual machine 101 from the OS 503. The measurement unit 1009 may also acquire the process management table from the OS 503, total the CPU utilization of each process, and calculate the CPU utilization of the own virtual machine 101.

When using the memory utilization of the virtual machine 101 as the processing load, for example, the measurement unit 1009 acquires the amount of the memory used by the own virtual machine 101 from the OS 503, and calculates the memory utilization rate of the own virtual machine 101. The measurement unit 1009 may also acquire the process management table from the OS 503, and calculate the amount of the memory used by the own virtual machine 101 based on the amount of the memory used by each process.

When using the response time of the virtual machine 101 as the processing load, for example, the measurement unit 1009 may measure the response time of the virtual machine 101.

Then, the transmitter 1003 transmits a notification of the processing load of the own virtual machine 101 to the management apparatus 409 (S3505).

Next, the fourth agent processing (S715 in FIG. 7) on the virtual machine 101 side when receiving a selection request that was transmitted from the second extraction unit 907 in the step S3101 in FIG. 31 will be explained.

Figure 36:
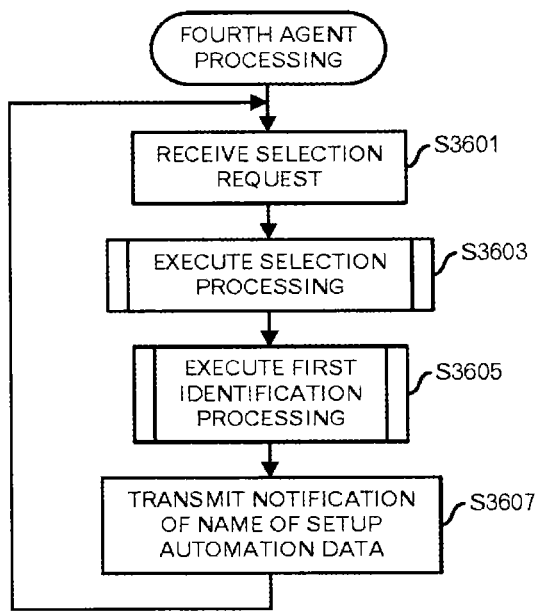
FIG. 36 is a diagram depicting a processing flow of a fourth agent processing.

FIG. 36 illustrates a processing flow of the fourth agent processing. The acceptor 1001 accepts a selection request from the second extraction unit 907 (S3601). After accepting the selection request, the selection unit 1013 executes the selection processing (S3603).

Figure 37:
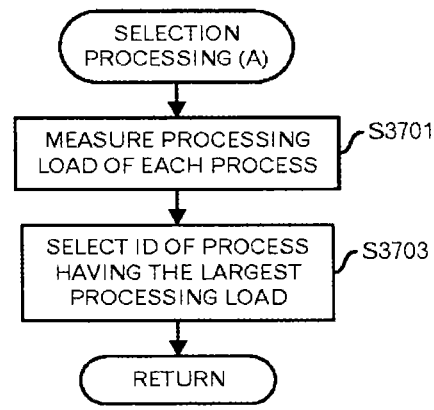
FIG. 37 is a diagram depicting a processing flow of a selection processing (A)

In this embodiment, the selection unit 1013 executes a selection processing (A). Incidentally, in a third embodiment, the selection unit 1013 executes a selection processing (B). FIG. 37 illustrates a processing flow of the selection processing (A). The selection unit 1013 measures a processing load of each process by the software that is installed in that virtual machine 101 (S3701).

When using the CPU utilization as the processing load, for example, the selection unit 1013 may also acquire the process management table from the OS 503, and identify the CPU utilization of the processes.

When using the memory utilization rate as the processing load, for example, the selection unit 1013 may also acquire the process management table from the OS 503 and calculate the memory utilization rate based on the amount of the memory used by the processes.

When using the response time as the processing load, the selection unit 1013 may also measure a response time of a process. The selection unit 1013 may also cause the measurement unit 1009 to measure the response time of the process.

The selection unit 1013 then selects an ID of a process having largest processing load (S3703). For example, in the example of the process management table illustrated in FIG. 16, the ID of the process having the largest CPU utilization is "2057". After the selection processing (A) ends, the processing returns to the step S3605 in FIG. 36.

Figure 38:
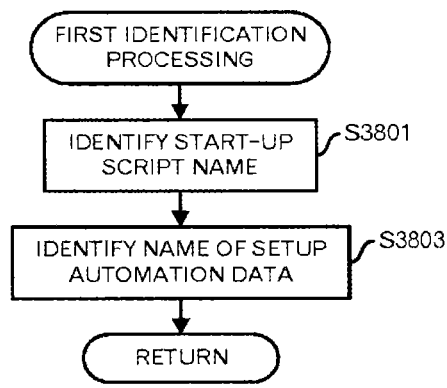
FIG. 38 is a diagram depicting a processing flow of a first identification processing.

Returning to an explanation of FIG. 36, the first identification unit 1015 executes the first identification processing (S3605). FIG. 38 illustrates a processing flow of the first identification processing. The first identification unit 1015 uses the second relation table to identify a start-up script name that is related to the process ID that was selected in the selection processing (S3603) (S3801). Furthermore, the first identification unit 1015 uses the first relation table to identify a name of the setup automation data that is related to the start-up script name (S3803).

For example, when the selected process ID is "2057", the second relation table illustrated in FIG. 18 is used, and the start-up script name "/opt/local/bin/aplb.sh" is identified. Furthermore, the first relation table illustrated in FIG. 17 is used, and the name of the setup automation data "aplb.rb" that corresponds to the start-up script name "/opt/local/bin/aplb.sh" is identified.

In the first identification processing, the first identification unit 1015 may also use the relation table illustrated in FIG. 28 to directly identify the name of the setup automation data that is related to the process ID that was selected in the selection processing (S3603). After the first identification processing ends, the processing returns to the processing of the step S3607 illustrated in FIG. 36.

Returning to the explanation of FIG. 36, the transmitter 1003 transmits a notification of the identified name of the setup automation data to the management apparatus 409 (S3607).

Here, the distinction between versions of software will be described. For example, even in a state in which version 2 of software "AplB" is installed, the start-up script name is "/opt/local/bin/aplb.sh", which is the same as in the case in which version 1 of software "AplB" is installed, and the command names used when starting a process are both "aplb". Therefore, making a distinction between version 1 of software "AplB" and version 2 of software "AplB" is difficult. However, with this embodiment, it is also possible to make distinction between versions of software.

With this embodiment, the setup automation data that is used during setup is identified using the first relation table. Therefore, it is possible to distinguish between different versions of setup automation data.

Figures 39, 41:
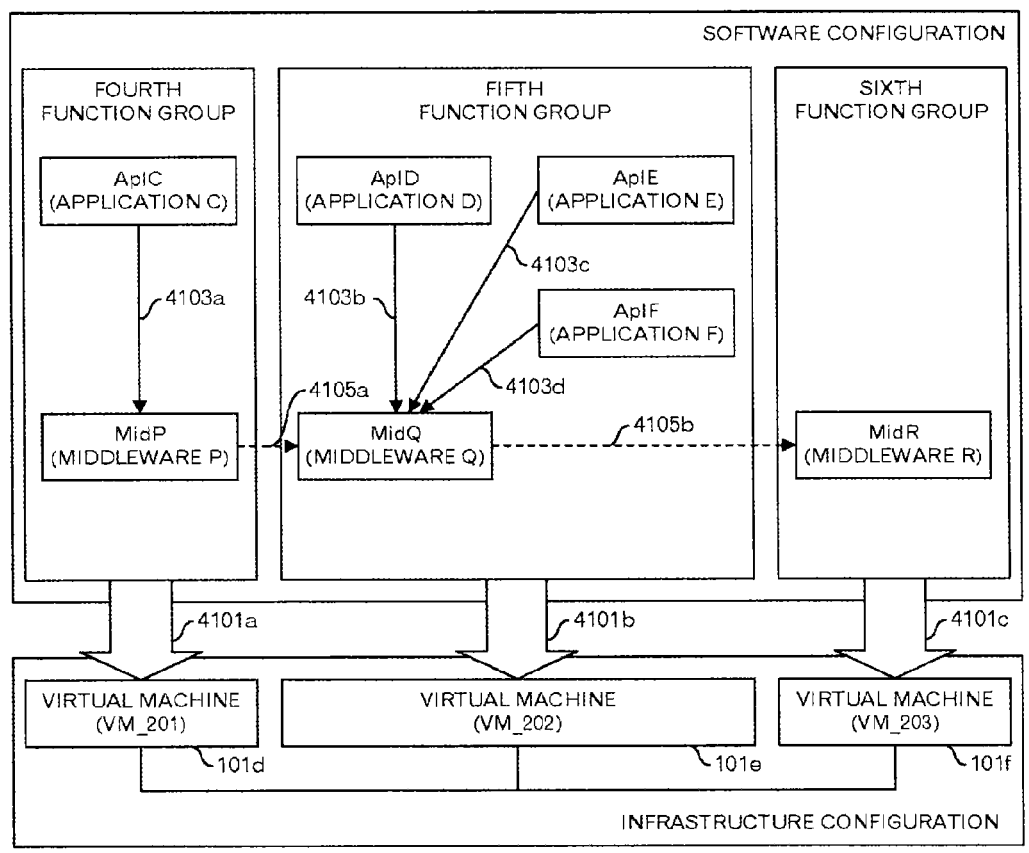
FIG. 39 is a diagram depicting an example of the first relation table.
FIG. 41 is a diagram depicting an example of the software configuration and the infrastructure configuration relating to a second embodiment.

FIG. 39 illustrates an example of the first relation table when version 2 of software "AplB" is installed. In this example, the first relation table has the same structure as the first relation table illustrated in FIG. 17. Moreover, in this example, the first to third records are the same as the case of FIG. 17. However, the name of the setup automation data in the fourth record is "aplb_2.rb", which is different from the case of the first relation table illustrated in FIG. 17. In this way, the name of the setup automation data "aplb_2.rb" is associated for software "AplB" whose version is 2.

FIG. 40 illustrates an example of the setup automation data for "aplb_2.rb". In a range 4001, instructions are entered to install the package "aplb_2" of version 2 using a predetermined package management system. The name of the package differs from that in the case of the range 1201 illustrated in FIG. 12. In a range 4003, instructions are entered to set a command that is accepted by the service "aplb" and start a process, similarly to the range 1203 illustrated in FIG. 12. In a range 4005, instructions are entered to create a setting file "/opt/etc/aplb.conf" for software "AplB" and to set an initial value for each variable by using a template called "aplb_conf.erb". In this example, there is one more instruction when compared with the range 1205 illustrated in FIG. 12. More specifically, an instruction related to variable "max_session" is added. There are cases in which, depending on the version, the initial settings differ in this way. Ina range 4007, instructions are entered to create a setting file "/etc/resolve.conf" for the operating environment and to set initial values for each variable by using a template called "etc_resolve.conf.erb" similarly to the range 1207 illustrated in FIG. 12. In this example, the same operating environment as that in version 1 is set, however, it is also possible to enter, as for setting the operating environment, different instructions depending on the version.

As described above, when version 1 of software "AplB" is installed in the overloaded virtual machine 101, the setup automation data "aplb.rb" (FIG. 12) that was used when setting up version 1 of software "AplB" is identified. Then, the package "aplb" that corresponds to version 1 is installed using this "aplb.rb" in a new virtual machine 101, and the initial settings for version 1 are performed.

On the other hand, when version 2 of software "AplB" is installed in the overloaded virtual machine 101, the setup automation data "aplb_2.rb" (FIG. 40) that was used when setting up version 2 of software "AplB" is identified. Then, the package "aplb_2" that corresponds to version 2 is installed using this "aplb_2.rb" in a new virtual machine 101, and the initial settings for version 2 are performed.

Therefore, even though version 2 of software "AplB" is installed in the overloaded virtual machine 101, for example, it is possible to avoid erroneous operation such as version 1 of software "AplB" being installed using version 1 of the setup automation data. Moreover, erroneously performing initial settings for version 1 is also prevented.

With this embodiment, software related to processes, of the process groups that are operated by the overloaded virtual machine 101, which satisfy the predetermined condition are selectively installed in a new virtual machine 101. Therefore, it is possible to limit the software that is installed, and thus to reduce consumption of resources in virtual machines 101 to be newly deployed.

Moreover, by maintaining the operation of software related to processes satisfying the predetermined condition, including processings by the dependence-destination software, processings by processes satisfying the predetermined condition are dispersed and thus it is possible to effectively use resources assigned to that software.

Furthermore, the first association processing and the second association processing are performed, and setup automation data that was used in the initial setup is identified according to the relationship with the start-up script, so it is assured that the process started in a new virtual machine 101 will be equivalent to the process satisfying the predetermined condition. Therefore, resources that are assigned to the software related to that process are not wasted.

Moreover, the process related to the greatest processing load of all of the processing loads of the processes is selected, so the efficiency of dispersing the processing load is increased, and it is possible to effectively use the resources that are assigned to the software related to that process in a new virtual machine 101.

[Embodiment 2]

In the embodiment described above, an example in which a processing load of a process related to dependence-source software becomes high such as an application was explained. However, in this embodiment, an example in which a processing load of a process related to dependence-destination software becomes high such as middleware will be explained.

FIG. 41 illustrates an example of the software configuration and infrastructure configuration of a second embodiment. The functions of this system are realized by combining function "application C", function "application D", function "application E", function "application F", function "middleware P", function "middleware Q" and function "middleware R".

As is the case in FIG. 1 that was explained in the first embodiment, the upper part of FIG. 41 illustrates the software configuration for realizing the functions of this system. The function "application C" is realized by executing a processing of software "AplC" on one of the virtual machines 101. The function "application D" is similarly realized by executing a processing of software "AplD" on one of the virtual machines 101. The function "application E" is realized by executing a processing of software "AplE" on one of the virtual machines 101. The function "application F" is similarly realized by executing a processing of software "AplF" on one of the virtual machines 101.

As is the case in FIG. 1 that was explained in the first embodiment, for the convenience of explanation, the software is divided into function groups. The combination of software "AplC" and software "MidP" is called a fourth function group. The combination of software "AplD", software "AplE", software "AplF" and software "MidQ" is called the fifth function group. Software "MidR" is called the sixth function group. However, it is also possible to not divide the software into function groups.

As is the case in FIG. 1 that was explained in the first embodiment, the lower part of FIG. 41 illustrates the infrastructure configuration that includes virtual machines 101 that are used in the system. In this example, the system uses virtual machine 101d, virtual machine 101e and virtual machine 101f. As illustrated in the figures, the virtual machine ID of virtual machine 101d is "VM_201", the virtual machine ID of virtual machine 101e is "VM_202", and the virtual machine ID of virtual machine 101f is "VM_203. The lines connecting virtual machine 101d, virtual machine 101e and virtual machine 101f represent that virtual machine 101d, virtual machine 101e and virtual machine 101f are connected by way of a virtual network.

As is the case in FIG. 1 that was explained in the first embodiment, the large arrows 4101 in FIG. 41, or in other words, the arrows that point from a function group to a virtual machines 101 represent the relationship between a virtual machines 101 and software that is installed in that virtual machines 101. The large arrow 4101a on the left side represents that software "AplC" and software "MidP" that are included in the fourth function group are installed in the virtual machine 101d. The large arrow 4101b in the center represents that software "AplD", software "AplE", software "AplF" and software "MidQ" that are included in the fifth function group are installed in the virtual machine 101e. Moreover, the large arrow 4101c on the right side represents that software "MidR" that is included in the sixth function group is installed in the virtual machine 101f.

As is the case in FIG. 1 that was explained in the first embodiment, the solid arrows 4103 in FIG. 41 represent the dependence relationship between software. The solid arrow 4103a that is illustrated in the fourth function group represents that software "AplC" depends on software "MidP". In this dependence relationship, software "AplC" is the dependence source, and software "MidP" is the dependence destination.

The solid arrows 4103b to 4103d illustrated inside the fifth function group represent that software "AplD", software "AplE" and software "AplF" depend on software "MidQ". In these dependence relationships, software "AplD", software "AplE" and software "AplF" are the dependence sources, and software "MidQ" is a common dependence destination.

As is the case in FIG. 1 that was explained in the first embodiment, the dashed arrows 4105 in FIG. 41 represent the calling relationship between software. For example, a dashed arrow 4105a on the left side represents that software "MidP" calls software "MidQ". In this calling relationship, software "MidP" is the calling source and software "MidQ" is the calling destination. A dashed arrow 4105b on the right side similarly represents that software "MidQ" calls software "MidR". In this calling relationship, software "MidQ" is the calling source, and software "MidR" is the calling destination.

FIG. 42 illustrates an example of a software configuration table in this second embodiment. In this example, the software configuration table has the same structure as the software configuration table illustrated in FIG. 13.

The example illustrated in FIG. 42 presumes the software configuration illustrated in FIG. 41. In the following, the first record will be explained. The name of the software that is identified by the software ID "S_01" is "AplC", and represents that the software realizes function "application C".

Furthermore, the first record represents that the ID of software that the software depends on is "S_02", and that there is no software that the software calls. In other words, this means that software "AplC" depends on software "MidP", however, does not call other software.

Furthermore, the first record represents that there is no software that is an object of exclusion in the software, and that the ID of software whose condition is being simultaneously installed in a common virtual machine 101 is "S_02". In other words, software "MidP" is simultaneously installed in the virtual machine 101 in which software "AplC" is installed. Moreover, arbitrary software may be simultaneously installed in the virtual machine 101 in which software "AplC" is installed.

Furthermore, the first record represents that the name of the setup automation data that is provided for setup of the software is "aplc.rb", and that the ID of the virtual machine 101 in which the software is installed is "VM_201".

Next, the second record will be explained. The second record represents that the name of the software that is identified by the software ID "S_02" is "MidP", and that the software realizes the function "middleware P".

Furthermore, the second record represents that there is no software that the software depends on, and that the ID of software that the software calls is "S_06". In other words, this means that software "MidP" does not depend on other software, and calls software "MidQ".

Furthermore, the second record represents that the ID of software in the software, which is an object of exclusion, is "S_07", and that there is no software for which being simultaneously installed in a common virtual machine 101 is a condition. In other words, software "MidR" is not installed in the virtual machine in which software "MidP" is installed. Moreover, the specific software is not always installed simultaneously in the virtual machine 101 in which software "MidP" is installed.

Furthermore, the second record represents that the name of the setup automation data that is provided for setup of the software is "midp.rb", and that the ID of the virtual machine 101 in which the software is installed is "VM_201".

Next, the third record will be explained. The third record represents that the name of the software that is identified by the software ID "S_03" is "AplD", and that the software realizes the function "application D".

Moreover, the third record represents that the ID of the software that the software depends on is "S_06", and that there is no software that the software calls. In other words, this means that software "AplD" depends on software "MidQ", and does not call other software.

Furthermore, the third record represents that there is no software that is an object of exclusion in the software, and that the ID of software whose condition is being simultaneously installed in a common virtual machine 101 is "S_06". In other words, software "MidQ" is simultaneously installed in the virtual machine 101 in which software "AplD" is installed. Moreover, it is also possible for arbitrary software to be simultaneously installed in the virtual machine 101 in which software "AplD" is installed.

The third record also represents that the name of the setup automation data that is provided for setup of the software is "apld.rb", and the ID of the virtual machine 101 in which the software is installed is "VM_202".

Next, the fourth record will be explained. The fourth record represents that the name of the software that is identified by the software ID "S_ 04" is "AplE", and the software realizes the function "application E".

Moreover, the fourth record represents that the ID of the software that the software depends on is "S_06", and that there is no software that the software calls. In other words, this means that the software "AplE" depends on software "MidQ", however, does not call other software.

Furthermore, the fourth record represents that there is no software that is an object of exclusion in the software, and that the ID of the software for which being simultaneously installed in a common virtual machine 101 is a condition is "S_06". In other words, software "MidQ" is simultaneously installed in the virtual machine 101 in which software "AplE" is installed. Moreover, it is also possible for arbitrary software to be simultaneously installed in the virtual machine 101 in which software "AplE" is installed.

The fourth record also represents that the name of the setup automation data that is provided for setup of the software is "aple.rb", and that the ID of the virtual machine 101 in which the software is installed is "VM_202".

Next, the fifth record will be explained. The fifth record represents that the name of the software that is identified by the software ID "S_05" is "AplF", and that the software realizes the function "application F".

Moreover, the fifth record represents that the ID of the software that the software depends on is "S_06", and that there is no software that the software calls. In other words, this means that software "AplF" depends on software "MidQ", however does not call other software.

Furthermore, the fifth record represents that there is no software that is an object of exclusion in the software, and that the ID of software for which being simultaneously installed in a common virtual machine 101 is a condition is "S_06". In other words, software "MidQ" is simultaneously installed in the virtual machine 101 where software "AplF" is installed. Moreover, it is also possible for arbitrary software to be simultaneously installed in the virtual machine 101 where software "AplF" is installed.

The fifth record also represents that the name of the setup automation data that is provided for setup of the software is "aplf.rb", and that the ID of the virtual machine 101 where the software is installed is "VM_202".

Next, the sixth record will be explained. The sixth record represents that the name of the software that is identified by the software ID "S_06" is "MidQ", and that the software realizes the function "middleware Q"

Moreover, the sixth record represents that there is no software that the software depends on, and that the ID of the software that the software calls is "S_07". In other words, this means that software "MidQ" does not depend on other software, and calls software "Mid R".

Furthermore, the sixth record represents that the ID of software in the software, which is an object of exclusion, is "S_07", and that there is no software whose condition is being simultaneously installed in a common virtual machine 101. In other words, software "MidR" is not installed in the virtual machine 101 where software "MidQ" is installed. Moreover, the specific software is not always installed simultaneously in the virtual machine 101 in which software "MidQ" is installed.

The sixth record also represents that the name of the setup automation data that is provided for setup of the software is "midq.rb", and the ID of the virtual machine 101 where the software is installed is "VM_202".

Next, the seventh record will be explained. The seventh record represents that the name of the software that is identified by the software ID "S_07" is "MidR", and that the software realizes the function "middleware R".

Moreover, the seventh record represents that there is no software that the software depends on, and that there is also no software that the software calls. In other words, this means that software "MidR" does not depend on other software, and also does not call other software.

Furthermore, the seventh record represents that the IDs of software in the software, which is an object of exclusion, are "S_02" and "S_06", and that there is no software whose condition is being simultaneously installed in a common virtual machine 101. In other words, software "MidP" and software "MidQ" are not installed in the virtual machine 101 in which software "MidR" is installed. Moreover, the specific software is not always installed simultaneously in the virtual machine 101 in which software "MidR" is installed.

The seventh record also represents that the name of the setup automation data that is provided for setup of the software is "midr.rb", and that the ID of the virtual machine 101 where the software is installed is "VM_203".

Figure 43:
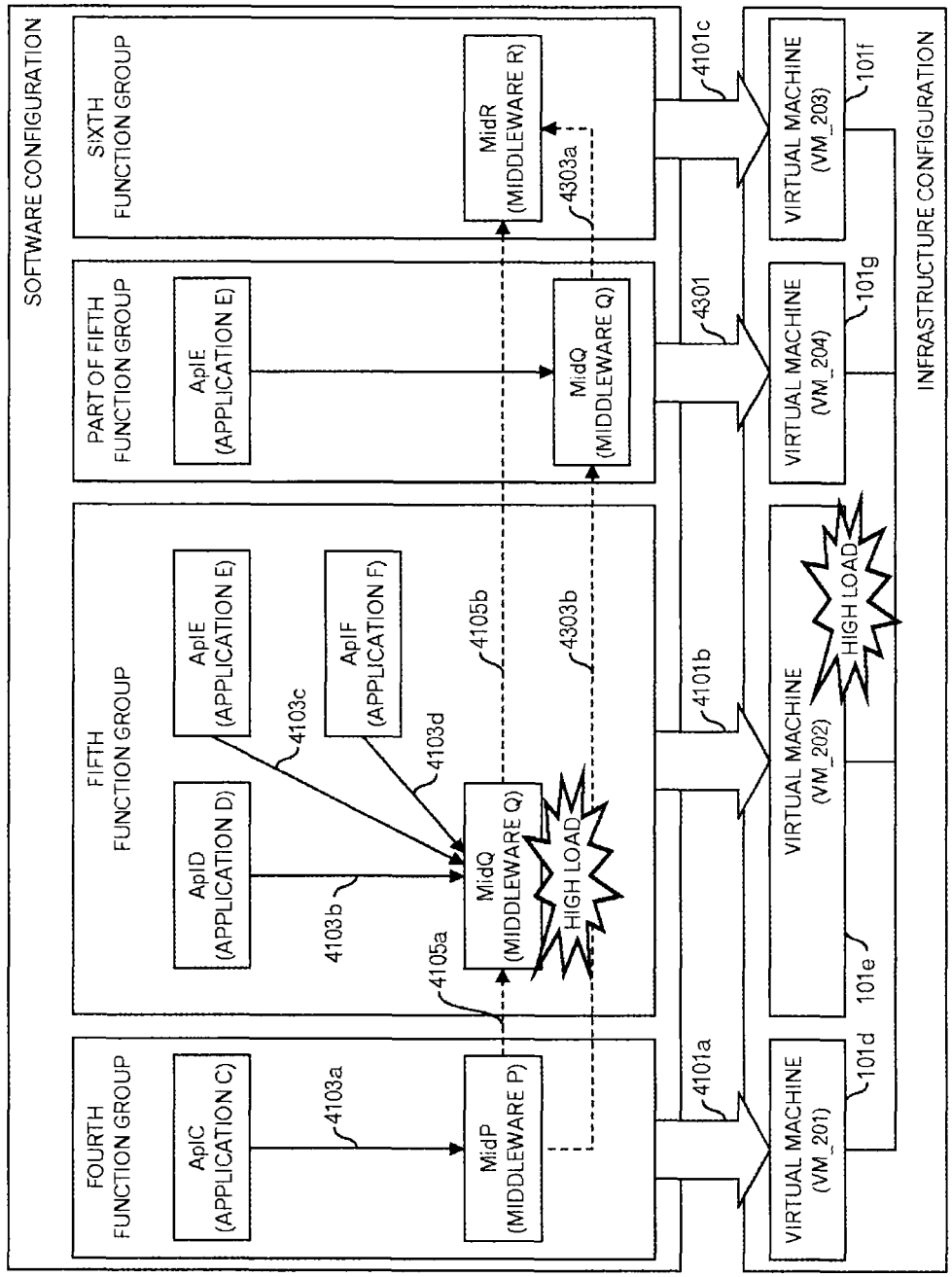
FIG. 43 is a diagram depicting an example of the scale-out relating to the second embodiment.

Next, scale-out of the second embodiment will be explained. FIG. 43 illustrates an example of the scale-out of the second embodiment. This example is based on the software configuration and the infrastructure configuration illustrated in FIG. 41. In the operation phase, it is presumed that a processing load of a process related to software "MidQ" in the software configuration illustrated in FIG. 41 becomes high, and as a result, the processing load of virtual machine 101e exceeds a threshold. In other words, the process related to software "MidQ" is the main cause of overloading of virtual machine 101e.

In this embodiment, in the automatic scaling processing, virtual machine 101e whose processing load exceeded the threshold is detected, and the scale-out is performed. By performing the scale-out, virtual machine 101g is added. As illustrated in the figure, the virtual machine ID of virtual machine 101g is "VM_204".

Part of the software that is installed in virtual machine 101e is installed in virtual machine 101g. In this example, a processing load of the process related to software "MidQ" is high, so software "MidQ" is installed in virtual machine 101g. In other words, the function of the software for which the processing load became high in the already existing virtual machine 101e is also realized by the new virtual machine 101g.

Moreover, software "AplD", software "AplE", and software "AplF" are dependent on software "MidQ". In this example, of software "AplD", software "AplE", and software "AplF", software "AplE" having the highest processing load is also installed together in virtual machine 101g. By doing so, software "AplE" and software "MidQ" are linked together. As illustrated by the large arrow 4301, the resources of virtual machine 101g are assigned to software "AplE" and software "MidQ" that correspond to part of the fifth function group.

On the other hand, software "AplD" and software "AplF" that are included in the fifth function group are not installed in the virtual machine 101g. Moreover, software "AplC" and software "MidP" that are included in the fourth function group are not installed in the virtual machine 101g. In other words, the resources of virtual machine 101g are not assigned to software "AplC", software "AplD", software "AplF" and software "MidP". In this way, resources are not additionally assigned for functions for which there is sufficient processing capability. Therefore, it is possible to reduce the consumption of new resources.

As illustrated by the dashed arrow 4303a, software "MidQ" that is installed in virtual machine 101g calls software "MidR" that is installed in virtual machine 101f, and as illustrated by the dashed arrow 4303b, software "MidP" that is installed in virtual machine 101d calls software "MidQ" that is installed in virtual machine 101g. Therefore, in the infrastructure configuration, the virtual machine 101g is connected to virtual machine 101d and virtual machine 101f by way of a virtual network.

In this embodiment, in the step S3003 illustrated in FIG. 30, the second extraction processing (B) is executed instead of the second extraction processing (A) that was explained for the first embodiment.

Figures 44, 46:
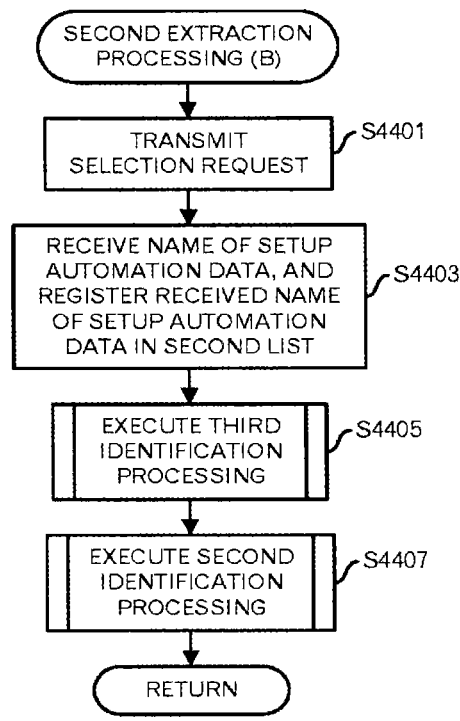
FIG. 44 is a diagram depicting a processing flow of a second extraction processing (B)
FIG. 46 is a diagram depicting an example of the second list relating to the second embodiment.

FIG. 44 illustrates a processing flow of the second extraction processing (B). The second extraction unit 907, as is the case of the step S3101 illustrated in FIG. 31, transmits a selection request to an overloaded virtual machine 101 (S4401).

The second extraction unit 907, as is the case of the step S3103 illustrated in FIG. 31, receives the name of the setup automation data of software related to the process that satisfies the predetermined condition from the overloaded virtual machine 101, and registers the received name of the setup automation data in the second list (S4403).

The third identification unit 911 executes the third identification processing (S4405), and then the second identification unit 909 executes the second identification processing (S4407). In other words, in this embodiment, in the second identification processing, before identifying the setup automation data for the dependence-destination software, setup automation data for the dependence-source software is identified in the third identification processing. By identifying the dependence-source side first in this way, it is possible to setup other software in the case when software "AplE" illustrated in FIG. 43, for example, depends on other software. Therefore, it is possible to avoid problems in software "AplE". However, it is also possible to perform the third identification processing after the second identification processing. Alternatively, the second identification processing may also be omitted.

Figure 45:
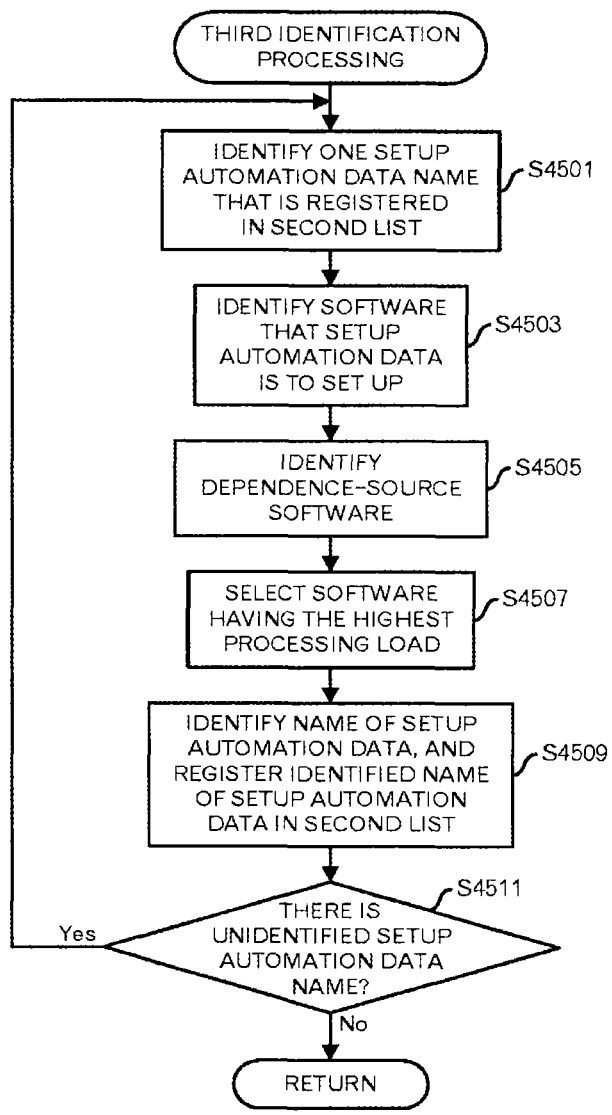
FIG. 45 is a diagram depicting a processing flow of a third identification processing.

FIG. 45 illustrates a processing flow of the third identification processing. The third identification unit 911 identifies one name of the setup automation data that is registered in the second list (S4501). The third identification unit 911 then uses a software configuration table to identify software that the setup automation data is to set up (S4503).

The third identification unit 911 uses the software configuration table to identify software that depends on the software identified in the step S4501, or in other words, the dependence-source software (S4505).

In the case where plural dependence sources are identified, the third identification unit 911 selects the software having the highest processing load (S4507). However, the third identification unit 911 does not need to limit the dependence-source software. Furthermore, the third identification unit 911 uses the software configuration table to identify a name of the setup automation data for the dependence-source software, and registers the identified name of the setup automation data in the second list (S4509).

The third identification unit 911 then determines whether or not there is an unidentified name of the setup automation data in the second list (S4511). When it is determined that there is an unidentified name of the setup automation data, the processing returns to the step S4501 and the processing described above is repeated.

Here, a name of the setup automation data that was registered in the step S4509 is determined to be unidentified in the step S4511 and becomes the object of identification in the step S4501. In this way, software that the dependence-source software depends on, or in other words, software that depends on indirectly may also be identified.

In the step S4511, when it is determined that there is no unidentified name of the setup automation data, the third identification processing ends, and the processing returns to the step S4407 in FIG. 44.

The second identification unit 909 then executes the second identification processing, and after the second extraction processing (B) ends, the processing returns to the step S3005 in FIG. 30. After this, processing is performed similarly to the case in the first embodiment.

FIG. 46 illustrates an example of the second list of this second embodiment. In this example, the software configuration table has the same structure as the second list illustrated in FIG. 32.

In this example, the second list represents that setup automation data "midp.rb" and setup automation data "aple.rb" are to be provided for setup. Moreover, in this stage, the second list represents that none of the setup automation data has already been provided for setup.

With this embodiment, a processing by a process that satisfies the predetermined condition is dispersed by linking processings of the dependence-source software, so that resources assigned to software related to the process satisfying the predetermined condition are not wasted. In other words, it is possible to prevent the software that is related to the process satisfying the predetermined condition from not performing a function.

[Embodiment 3]

In the embodiment described above, an example of selecting a process having the highest processing load was given. However, in this embodiment, an example in which one or more processes are selected so that the total processing load of the selected processes exceeds a predetermined threshold is explained.

Figure 47:
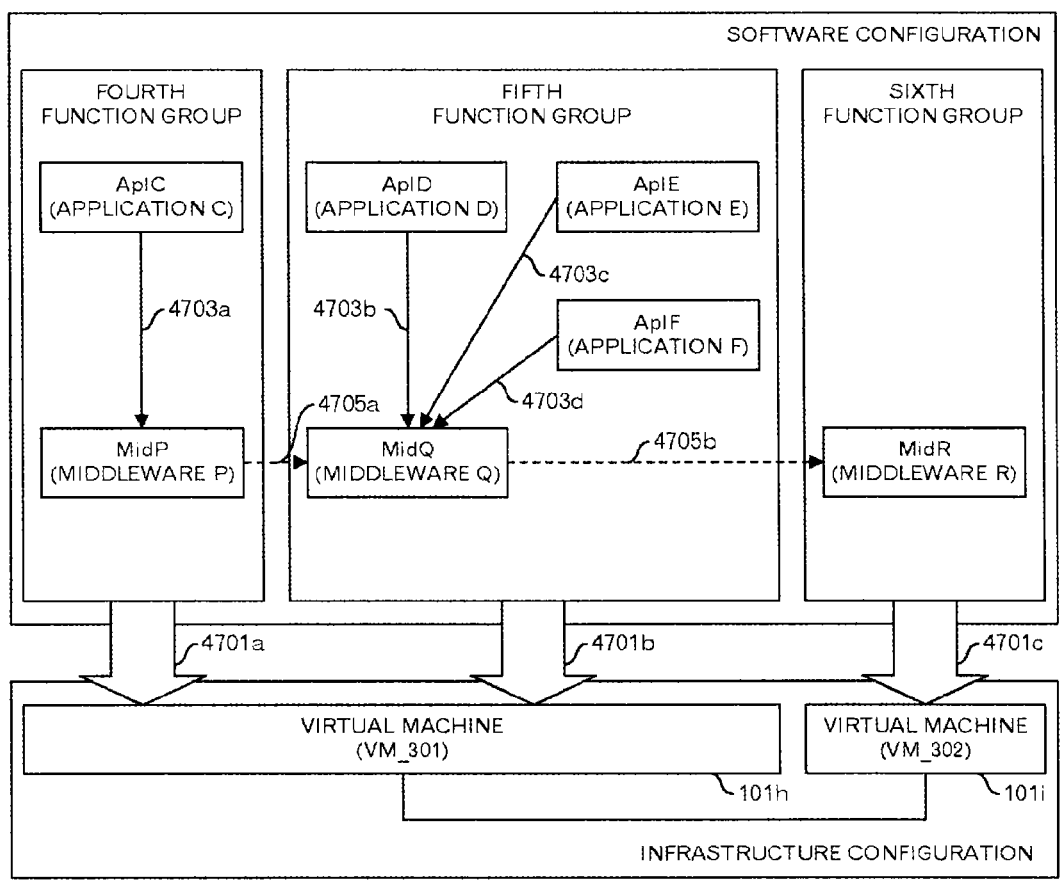
FIG. 47 is a diagram depicting an example of the software configuration and the infrastructure configuration relating to a third embodiment.

FIG. 47 illustrates an example of the software configuration and the infrastructure configuration of the third embodiment. The functions in this system are the same as those in FIG. 41 that was explained in the second embodiment.

The configuration of the software for realizing the functions of this system is the same as that in FIG. 41 explained in the second embodiment.

The software function groups are the same as those in FIG. 41 explained in the second embodiment.

As is the case in FIG. 41 explained in the second embodiment, the lower part of FIG. 47 illustrates the infrastructure configuration that includes the virtual machines 101 that are used in the system. In this example, the system uses virtual machine 101h and virtual machine 101i. As illustrated in the figure, the virtual machine ID of virtual machine 101h is "VM_301", and the virtual machine ID of virtual machine 101i is "VM_302". Moreover, the line connecting virtual machine 101h and virtual machine 101i represents that virtual machine 101h and virtual machine 101i are connected by way of a virtual network.

As is the case in FIG. 41 explained in the second embodiment, large arrows 4701 in FIG. 47, or in other words, arrows pointing from the function groups to the virtual machines 101, represent the relationships between the virtual machines 101 and software installed in the virtual machines 101. A large arrow 4701a on the left side represents that software "AplC" and software "MidP" that are included in the fourth function group are installed in the virtual machine 101h. A large arrow 4701b in the center represents that software "AplD", software "AplE", software "AplF" and software "MidQ" that are included in the fifth function group are installed in virtual machine 101h. Moreover, a large arrow 4701c on the right side represents that software "MidR" that is included in the sixth function group is installed in virtual machine 101i.

As is the case in FIG. 41 explained in the second embodiment, solid arrows 4703 in FIG. 47 illustrate the dependence relationships among software. A solid arrow 4703a illustrated in the fourth function group represents that software "AplC" depends on software "MidP". In this dependence relationship, software "AplC" is the dependence source, and software "MidP" is the dependence destination.

The solid arrows 4703b to 4703d illustrated inside the fifth function group represent that software "AplD", software "AplE" and software "AplF" depend on software "MidQ". In these dependence relationships, software "AplD", software "AplE" and software "AplF" are dependence sources, and software "MidQ" is a common dependence destination.

As is the case in FIG. 41 explained in the second embodiment, the dashed arrows 4705 in FIG. 47 represent the calling relationships among software. For example, a dashed arrow 4705a on the left side represents that software "MidP" calls software "MidQ". In this calling relationship, software "MidP" is the calling source, and software "MidQ" is the calling destination. Similarly, a dashed arrow 4705b on the right side represents that software "MidQ" calls software "MidR". In this calling relationship, software "MidQ" is the calling source, and software "MidR" is the calling destination.

FIG. 48 illustrates an example of the software configuration table of the third embodiment. In this example, the software configuration table has the same structure as the software configuration table illustrated in FIG. 42.

The example illustrated in FIG. 48 is based on the software configuration illustrated in FIG. 47. When compared with the case illustrated in FIG. 42, the virtual machine IDs are different. FIG. 48 represents that software "AplC", software "MidP", software "AplD", software "AplE", software "AplF" and software "MidQ" are installed in virtual machine 101h having virtual machine ID "VM_301", and software "MidR" is installed in virtual machine 101i having virtual machine ID "VM_302".

Figure 49:
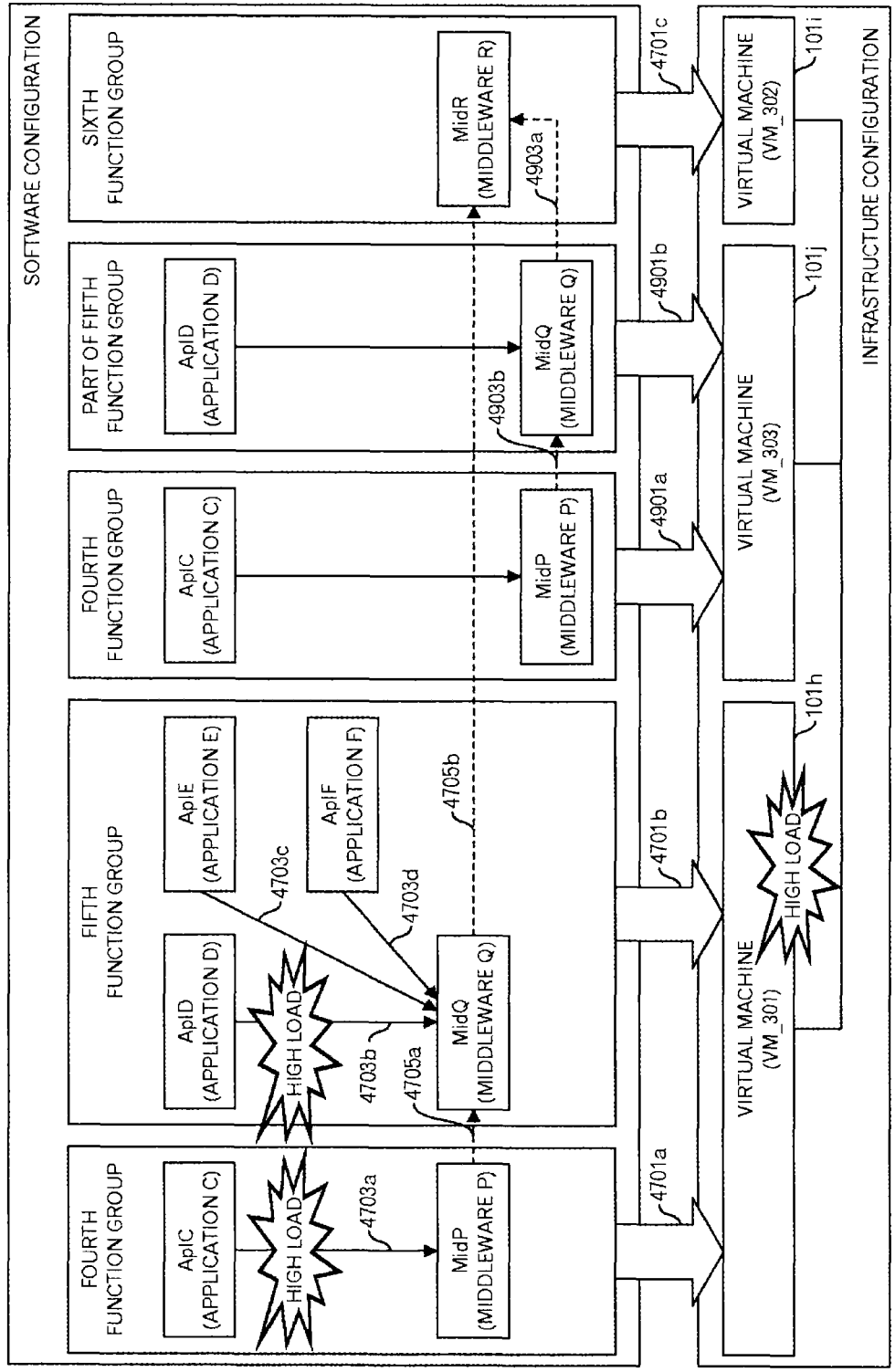
FIG. 49 is a diagram depicting an example of the scale-out of the third embodiment.

FIG. 49 illustrates an example of scale-out of this third embodiment. This example presumes the software configuration and the infrastructure configuration illustrated in FIG. 47. In the operation phase, of the software configuration illustrated in FIG. 47, processing loads of a process related to software "AplC" and a process related to software "AplD" are high, and as a result, the case in which the processing load of virtual machine 101h exceeds a threshold is assumed. In other words, the process related to software "AplC" and the process related to software "AplD" are the main cause for the overloading of virtual machine 101h.

In this embodiment, in the automated scale-out processing, the virtual machine 101h whose processing load exceeded the threshold is detected, and scale-out is performed. Then, by this scale-out, virtual machine 101j is added. As illustrated in FIG. 49, the virtual machine ID of the virtual machine 101j is "VM_303"

Part of the software that is installed in virtual machine 101h is installed in virtual machine 101j. In this example, processing loads of the processes related to software "AplC" and software "AplD" is high. Therefore, software "AplC" and software "AplD" are installed in virtual machine 101j. In other words, the function of software in already existing virtual machine 101h, for which the processing load became high, is also realized by the new virtual machine 101j.

Moreover, software "AplC" depends on software "MidP", so software "MidP" is also installed together in virtual machine 101j. Furthermore, software "AplD" depends on software "MidQ", so software "MidQ" is also installed together in virtual machine 101j. As a result, as illustrated by the large arrow 4901a, the resources of virtual machine 101j are assigned to software "AplC" and software "MidP" that are included in the fourth function group. As illustrated by the large arrow 4901b, the resources of virtual machine 101j are assigned to software "AplD" and software "MidQ" that correspond to part of the fifth function group.

On the other hand, software "AplE" and software "AplF" that are included in the fifth function group are not installed in virtual machine 101j. In other words, the resources of virtual machine 101j are not assigned to software "AplE" and software "AplF". Accordingly, for functions for which there is sufficient processing capability, resources are not additionally assigned to those functions. Therefore, it is possible to reduce the consumption of new resources.

Here, as illustrated by the dashed arrow 4903a, software "MidQ" that is installed in virtual machine 101j calls software "MidR" that is installed in virtual machine 101i. Therefore, in the infrastructure configuration, the virtual machine 101j connects to the virtual machine 101i by way of a virtual network. Moreover, as illustrated by the dashed arrow 4903b, software "MidP" that is installed in virtual machine 101j calls software "MidQ" that is installed in the same virtual machine 101j.

Figures 50, 51:
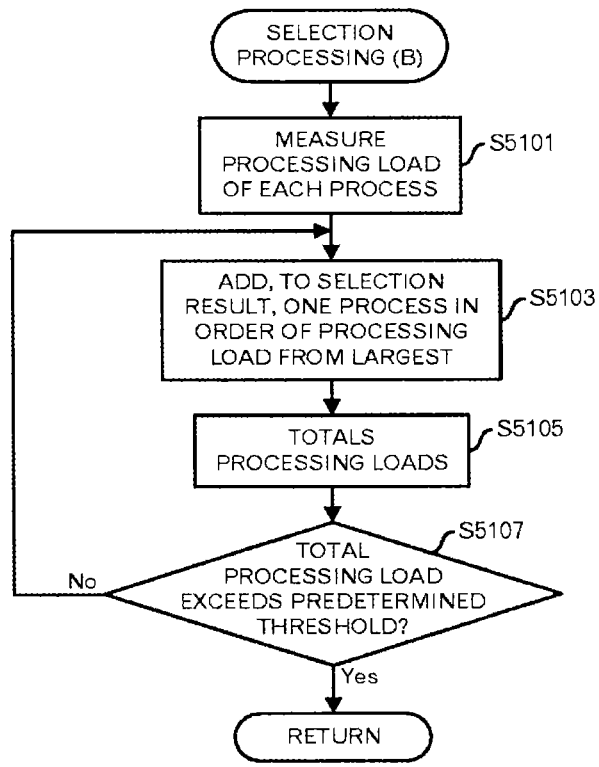
FIG. 50 is a diagram depicting an example of the process management table relating to the third embodiment.
FIG. 51 is a diagram depicting a processing flow of a selection processing (B)

FIG. 50 illustrates an example of the process management table in the third embodiment. In this example, the process management table has the same structure as the process management table illustrated in FIG. 16.

The first record represents that the CPU utilization of a process identified by process ID "1235" is "0.1". Moreover, the first record represents that the amount of memory usage for that process is "64 M". Furthermore, the first record represents that that process was started by command "midp".

The second record represents that the CPU utilization of a process identified by process ID "1624" is "0.1". Moreover, the second record represents that the amount of the memory usage for that process is "300 M". Furthermore, the second record represents that that process was started by command "midq".

The third record represents that the CPU utilization of a process identified by process ID "1842" is "0.3". Moreover, the third record represents that the amount of memory usage for that process is "256 M". Furthermore, the third record represents that that process was started by command "aplc".

The fourth record represents that the CPU utilization of a process identified by process ID "2058" is "0.25". Moreover, the fourth record represents that the amount of memory usage for that process is "256 M". Furthermore, the fourth record represents that that process was started by command "apld".

The fifth record represents that the CPU utilization of a process identified by process ID "1784" is "0.1". Moreover, the fifth record represents that the amount of the memory usage for that process is "64 M". Furthermore, the fifth record represents that that process was started by command "aple".

The sixth record represents that the CPU utilization of process identified by process ID "2103" is "0.1". Moreover, the sixth record represents that the amount of memory usage for that process is "64 M". Furthermore, the sixth record represents that that process was started by command "aplf".

In FIG. 50, the maximum CPU utilization, or in other words, the CPU utilization "0.3" in a process having process ID "1842" is small compared with the CPU utilization "0.6" in a process having process ID "2057" in FIG. 16 of the first embodiment. Therefore, even though the software related to the process having the highest processing load is installed in a new virtual machine 101, the effect of dispersing the load is less than that of the state illustrated in FIG. 16. However, when software related to a process having process ID "1842", and software related to a process having process ID "2058" are simultaneously installed in the new virtual machine 101, the effect of dispersing the load is large.

FIG. 51 illustrates a processing flow of the selection processing (B). As is the case in the step S3701 illustrated in FIG. 37, the selection unit 1013 measures processing loads of the processes for the software installed in the virtual machine 101 (S5101).

The selection unit 1013 adds, to the selection result, one process in the order of processing loads from largest (S5103). The selection unit 1013 totals the processing loads of the processes included in the selection result (S5105). Then, the selection unit 1013 determines whether or not the total processing load exceeds a predetermined threshold (S5107). When it is determined that the total processing load does not exceed the predetermined threshold, the processing returns to the step S5101, and the processing described above is repeated. On the other hand, when it is determined that the total processing load exceeds the predetermined threshold, the selection processing (B) ends, and the processing returns to the step S3605 in FIG. 36.

When the predetermined threshold that the total processing load is to exceed is "0.4", process ID "1842" and process ID "2058" in the example illustrated in FIG. 50 are selected. Here, process ID "1842" represents a process related to software "AplC", and process ID "2058" represents a process related to software "AplD".

FIG. 52 illustrates an example of the second list in the third embodiment. In this example, the second list has the same structure as the second lists illustrated in FIG. 32 and FIG. 46.

In this example, the second list represents that setup automation data "aplc.rb", setup automation data "apld.rb", setup automation data "midp.rb" and setup automation data "midq.rb" are to be provided for setup. Moreover, in this stage, the second list represents that none of the setup automation data has already been provided for setup.

With this embodiment, one or more processes are selected so that the total processing load of the selected processes exceeds the predetermined threshold, so the effectiveness of dispersing the processing load is high, and resources that are assigned to the software related to the processes may be effectively used in a new virtual machine 101.

Although the embodiments of this invention were explained above, this invention is not limited to those. For example, the functional block configuration does not always correspond to a program module configuration.

Moreover, the respective formats of the aforementioned storage areas are mere examples, and may be changed. Furthermore, as for the processing flow, as long as the processing results do not change, the turns of the steps may be exchanged or the steps may be executed in parallel.

In addition, the aforementioned physical server 301 is a computer device as shown in FIG. 53. That is, a memory 2501, a CPU 2503 (Central Processing Unit), a hard disk drive (HDD: Hard Disk Drive) 2505, a display controller 2507 connected to a display device 2509, a drive device 2513 for a removable disk 2511, an input unit 2515, and a communication controller 2517 for connection with a network are connected through a bus 2519 as shown in FIG. 53. An operating system (OS: Operating System) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are summarized as follows:

A scale-out method relating to the embodiments includes: upon detecting that a processing load of a first virtual machine among one or plural virtual machines exceeds a threshold, deploying a second virtual machine that is a new virtual machine; selecting a process that satisfies a predetermined condition based on processing loads of plural processes operating in the first virtual machine; first specifying first information for identifying first software related to selected process; and setting up the first software on the second virtual machine based on the first information.

By doing so, of the plural processes that are operated by the first virtual machine whose processing load exceeded the threshold, software related to a process satisfying the predetermined condition is selectively installed in the second virtual machine. Therefore, it is possible to limit the software that is installed, and thus reduce consumption of resources of virtual machines to be newly deployed.

Moreover, the scale-out method may further include: second specifying second information for identifying second software on which the first software depends. And the setting up may include: setting up the second software on the second virtual machine based on the second information.

Accordingly, by maintaining operation of the first software together with a state of a processing that the first software depends on, it is possible to disperse processings by processes satisfying the predetermined condition and to effectively use resources assigned to the first software.

Moreover, the scale-out method may further include: third specifying third information for identifying third software which depends on the first software. And the setting up may include: setting up the third software on the second virtual machine based on the third information.

By performing a processing as described above, the first software which is dependence-destination performs a processing in conjunction with a processing of the third software which is dependence source. Therefore, a processing by a process that satisfies the predetermined condition is dispersed, and resources assigned to the first software are effectively used.

Moreover, the first specifying may include: specifying the first information associated with the selected process.

By performing a processing as described above, the first information is identified according to the association with the selected process. Therefore, it is assured that a process started in the second virtual machine will be equivalent to the selected process. Therefore, resources that are assigned to the first software are not wasted.

In addition, the scale-out method may further include: first associating each of start-up scripts with information for identifying software by which the start-up script is generated; and second associating each of the start-up scripts with an identifier of a process started up by the start-up script. And the selecting may include: specifying an identifier of the process that satisfies the predetermined condition, and the first specifying may include: specifying the first information based on a start-up script associated with the identifier of the process.

By the aforementioned processing, the first information is identified based on the start-up script associated with the identifier of the process that satisfies the predetermined condition. Therefore, it is assured that the process started in the second virtual machine will be equivalent to the process that satisfies the predetermined condition. Therefore, resources that are assigned to the first software are not wasted.

Furthermore, the selecting may include: selecting the process related to a maximum processing load among the processing loads of the processes.

By performing a processing as describe above, efficiency of dispersing the processing load is increased, and it is possible to effectively use the resources that are assigned to the first software.

Furthermore, the selecting may include: selecting one or plural processes on a condition that a total sum of processing loads of the one or plural processes exceeds a predetermined reference value.

Accordingly, the effectiveness of dispersing the processing load becomes high, and the resources that are assigned to the first software can be effectively used.

An information processing apparatus in which virtual machines operates has: circuitry configured or programmed to select, upon detecting that a processing load of a first virtual machine exceeds a threshold, a process that satisfies a predetermined condition based on processing loads of plural processes operating in the first virtual machine; circuitry configured or programmed to specify first information for identifying software related to selected process; and circuitry configured or programmed to transmit the first information to a management apparatus.

A management apparatus has: circuitry configured or programmed to deploy, upon detecting that a processing load of a first virtual machine among the virtual machines exceeds a threshold, a second virtual machine that is a new virtual machine on a first information processing apparatus among the one or plural information processing apparatuses, in which the second virtual machine includes a setup unit that sets up software by first information for identifying the software; and circuitry configured or programmed to transmit, to the second virtual machine, second information, which is information for identifying software related to a process satisfying a predetermined condition and received from the first information processing apparatus.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A scale-out method, comprising:
    upon detecting that a processing load of a first virtual machine among one or plural virtual machines exceeds a threshold, deploying, by one of plural computers, a second virtual machine that is a new virtual machine;
    selecting, by one of the plural computers, a process that satisfies a predetermined condition based on maximum or total processing loads of plural processes operating in the first virtual machine;
    first specifying, by one of the plural computers, a first program that includes an instruction for installing first software related to the selected process and an instruction for performing initial setting of the first software;
    second specifying, by one of the plural computers, a second program that includes an instruction for installing second software which has a first predetermined relationship with the first software and an instruction for performing initial setting of the second software, wherein the first predetermined relationship is a relationship in which the first software is executed in a case where the second software is installed on a virtual machine on which the first software is simultaneously installed;
    first installing, by one of the plural computers in response to the first predetermined relationship being satisfied, the first software and the second software on the second virtual machine by the first program and the second program; and
    first performing, by one of the plural computers, the initial setting of the first software and the second software by the first program and the second program.

2. The scale-out method as set forth in claim 1, further comprising:
    third specifying, by one of the plural computers, a third program that includes an instruction for installing third software which has a second predetermined relationship with the first software and an instruction for performing initial setting of the third software, wherein the second predetermined relationship is a relationship in which the third software is executed in a case where the first software is installed on a virtual machine on which the third software is installed, the first installing comprises installing the third software on the second virtual machine by the third program, and the first performing comprises performing the initial setting of the third software by the third program.

3. The scale-out method as set forth in claim 1, further comprising:

first associating, by one of the plural computers, each of start-up scripts with a program, by which the start-up script is generated; and second associating, by one of the plural computers, each of the start-up scripts with an identifier of a process started up by the start-up script, wherein the selecting comprises specifying an identifier of the process that satisfies the predetermined condition, and the first specifying comprises specifying, from plural programs which have been associated with the start-up scripts, the first program based on a start-up script associated with the identifier of the process.

4. The scale-out method as set forth in claim 1, wherein the selecting comprises selecting a process related to a maximum processing load among the processing loads of the plural processes.

5. The scale-out method as set forth in claim 1, wherein the selecting comprises selecting one or plural processes on a condition that a total sum of processing loads of the one or plural processes exceeds a predetermined reference value.

6. An information processing system, comprising:

one or plural information processing apparatuses for executing virtual machines; and a management apparatus connected to the one or plural information processing apparatuses, wherein the management apparatus comprises:

a memory; and a processor configured to use the memory and execute a first process, the first process comprising:

upon detecting that a processing load of a first virtual machine among the virtual machines exceeds a threshold, deploying a second virtual machine that is a new virtual machine on a first information processing apparatus among the one or plural information processing apparatuses, the first information processing apparatus comprises:

a memory; and a processor configured to use the memory and execute a second process, the second process comprising:

selecting a process that satisfies a predetermined condition based on maximum or total processing loads of plural processes operating in the first virtual machine;

first specifying a first program that includes an instruction for installing first software related to the selected process and an instruction for performing initial setting of the first software;

second specifying a second program that includes an instruction for installing second software which has a predetermined relationship with the first software and an instruction for performing initial setting of the second software, wherein the predetermined relationship is a relationship in which the first software is executed in a case where the second software is installed on a virtual machine on which the first software is simultaneously installed; and transmitting identification information of the first program and identification information of the second program to the management apparatus in response to the predetermined relationship being satisfied, wherein the first process further comprises transmitting, to the second virtual machine, the first program specified by the identification information of the first program, which has been received from the first information processing apparatus, and the second program specified by the identification information of the second program, which has been received from the first information processing apparatus, and the second virtual machine executes the first program and the second program.

7. An information processing apparatus, comprising:

a memory; and a processor configured to use the memory and execute a process, the process comprising:

upon detecting that a processing load of a virtual machine exceeds a threshold, selecting a process that satisfies a predetermined condition based on maximum or total processing loads of plural processes operating in the virtual machine;

first specifying a first program that includes an instruction for installing first software related to the selected process and an instruction for performing initial setting of the first software;

second specifying a second program that includes an instruction for installing second software which has a predetermined relationship with the first software and an instruction for performing initial setting of the second software, wherein the predetermined relationship is a relationship in which the first software is executed in a case where the second software is installed on a virtual machine on which the first software is simultaneously installed;

transmitting identification information of the first program and identification information of the second program to a management apparatus in response to the predetermined relationship being satisfied causing transmitting, to a second virtual machine, the first program specified by the identification information of the first program and the second program specified by the identification information of the second program to be executed by the second virtual machine.

* * * * *